US010603830B2

(12) United States Patent
Ausen et al.

(10) Patent No.: US 10,603,830 B2
(45) Date of Patent: Mar. 31, 2020

(54) POLYMERIC NETTING WITH RIBBONS AND STRANDS, AND METHODS OF MAKING THE SAME

(71) Applicant: 3M INNOVATIVE PROPERTIES COMPANY, St. Paul, MN (US)

(72) Inventors: Ronald W. Ausen, St. Paul, MN (US); Robert C. Etter, Oakdale, MN (US); William J. Kopecky, Hudson, WI (US); Michelle L. Legatt, Ventura, CA (US); Lori-Ann S. Prioleau, St. Paul, MN (US); Leigh E. Wood, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 92 days.

(21) Appl. No.: 15/536,559

(22) PCT Filed: Dec. 17, 2015

(86) PCT No.: PCT/US2015/066254
§ 371 (c)(1),
(2) Date: Jun. 15, 2017

(87) PCT Pub. No.: WO2016/106059
PCT Pub. Date: Jun. 30, 2016

(65) Prior Publication Data
US 2017/0361518 A1    Dec. 21, 2017

Related U.S. Application Data

(60) Provisional application No. 62/096,630, filed on Dec. 24, 2014.

(51) Int. Cl.
*B29C 48/30* (2019.01)
*B29C 48/345* (2019.01)
(Continued)

(52) U.S. Cl.
CPC .......... *B29C 48/30* (2019.02); *B29C 48/3001* (2019.02); *B29C 48/304* (2019.02);
(Continued)

(58) Field of Classification Search
CPC ...... B32B 5/022; B32B 5/028; D03D 14/0088
(Continued)

(56) References Cited

U.S. PATENT DOCUMENTS 3,032,008 A    5/1962 Land
3,178,328 A    4/1965 Tittmann
(Continued)

FOREIGN PATENT DOCUMENTS

CN    201879910    6/2011
DE    19806452    8/1999
(Continued)

OTHER PUBLICATIONS

International Search Report for PCT International Application No. PCT/US2015/066254, dated May 3, 2016, 6 pages.

*Primary Examiner* — Elizabeth C Imani
(74) *Attorney, Agent, or Firm* — James A. Baker; Gregory D. Allen

(57) ABSTRACT

Polymeric netting comprising polymeric ribbons and polymeric strands, each of the polymeric ribbons and polymeric strands having a length and a width, wherein the length is the longest dimension and the width is the shortest dimension, wherein a plurality of the polymeric strands are bonded together to form a netting layer, wherein adjacent polymeric strands in the netting layer are bonded intermittently at multiple locations along their respective lengths, wherein the netting layer has first and second opposing major surfaces, wherein the polymeric ribbons have a height-to-width aspect ratio of at least 2:1 and a minor surface defined by their width and length, and wherein the minor surface of a
(Continued)

plurality of the polymeric ribbons is bonded to the first major surface of the netting layer. Polymeric netting described herein are useful, for example, in an absorbent article.

11 Claims, 11 Drawing Sheets

(51) Int. Cl.
*B29C 48/305* (2019.01)
*B29D 28/00* (2006.01)
*B29C 48/00* (2019.01)
*B29L 31/48* (2006.01)

(52) U.S. Cl.
CPC .......... *B29C 48/307* (2019.02); *B29C 48/345* (2019.02); *B29D 28/005* (2013.01); *B29C 48/0021* (2019.02); *B29L 2031/4871* (2013.01)

(58) Field of Classification Search
USPC ............................................ 442/60; 428/119
See application file for complete search history.

(56) References Cited

U.S. PATENT DOCUMENTS

| | | |
|---|---|---|
| 3,749,535 A | 7/1973 | Gaffney |
| 4,384,022 A | 5/1983 | Fowler |
| 4,629,643 A | 12/1986 | Curro |
| 4,634,485 A | 1/1987 | Welygan |
| 4,719,185 A | 1/1988 | Goth |
| 5,135,521 A | 8/1992 | Luceri |
| 5,143,679 A | 9/1992 | Weber |
| 5,679,379 A | 10/1997 | Fabbricante |
| 5,773,374 A | 6/1998 | Wood |
| 5,817,704 A | 10/1998 | Shiveley |
| 6,069,097 A | 5/2000 | Suzuki |
| 6,159,584 A | 12/2000 | Eaton |
| 6,168,849 B1 | 1/2001 | Braverman |
| 6,461,339 B1 | 10/2002 | Sugahara |
| 6,669,887 B2 | 12/2003 | Hilston |
| 6,673,418 B1 | 1/2004 | DeOlivera |
| 6,740,792 B2 | 5/2004 | Waldroup |
| 6,949,283 B2 | 9/2005 | Kollaja |
| 7,351,217 B2 | 4/2008 | Scherpenborg |
| 7,757,334 B2 | 7/2010 | Patel |
| 7,897,078 B2 | 3/2011 | Petersen |
| 2003/0181882 A1 | 9/2003 | Toyoshima |
| 2004/0005832 A1 | 1/2004 | Neculescu |
| 2007/0136967 A1 | 6/2007 | Tochacek |
| 2008/0090050 A1 | 4/2008 | Seyler |
| 2008/0269708 A1 | 10/2008 | Caracci |
| 2009/0144923 A1 | 6/2009 | Tuman |
| 2009/0258210 A1 | 10/2009 | Iyad |
| 2011/0147475 A1 | 6/2011 | Biegler |
| 2011/0151171 A1 | 6/2011 | Biegler |
| 2012/0172826 A1 | 7/2012 | Ng |
| 2014/0050883 A1 | 2/2014 | Hanschen |
| 2014/0220328 A1 | 8/2014 | Ausen |
| 2014/0234605 A1 | 8/2014 | Ausen |
| 2014/0234606 A1 | 8/2014 | Ausen |
| 2016/0002838 A1 | 1/2016 | Ausen |
| 2017/0066210 A1 | 3/2017 | Wood |

FOREIGN PATENT DOCUMENTS

| | | |
|---|---|---|
| EP | 1137382 | 10/2001 |
| JP | 47-004091 | 2/1972 |
| JP | 08-300436 | 11/1996 |
| WO | 2010/109087 | 9/2010 |
| WO | 2011/119323 | 9/2011 |
| WO | 2013/028654 | 2/2013 |
| WO | 2013/032683 | 3/2013 |
| WO | 2013/052371 | 4/2013 |
| WO | 2014/028470 | 2/2014 |
| WO | 2014/164242 | 10/2014 |
| WO | 2015/130942 | 9/2015 |

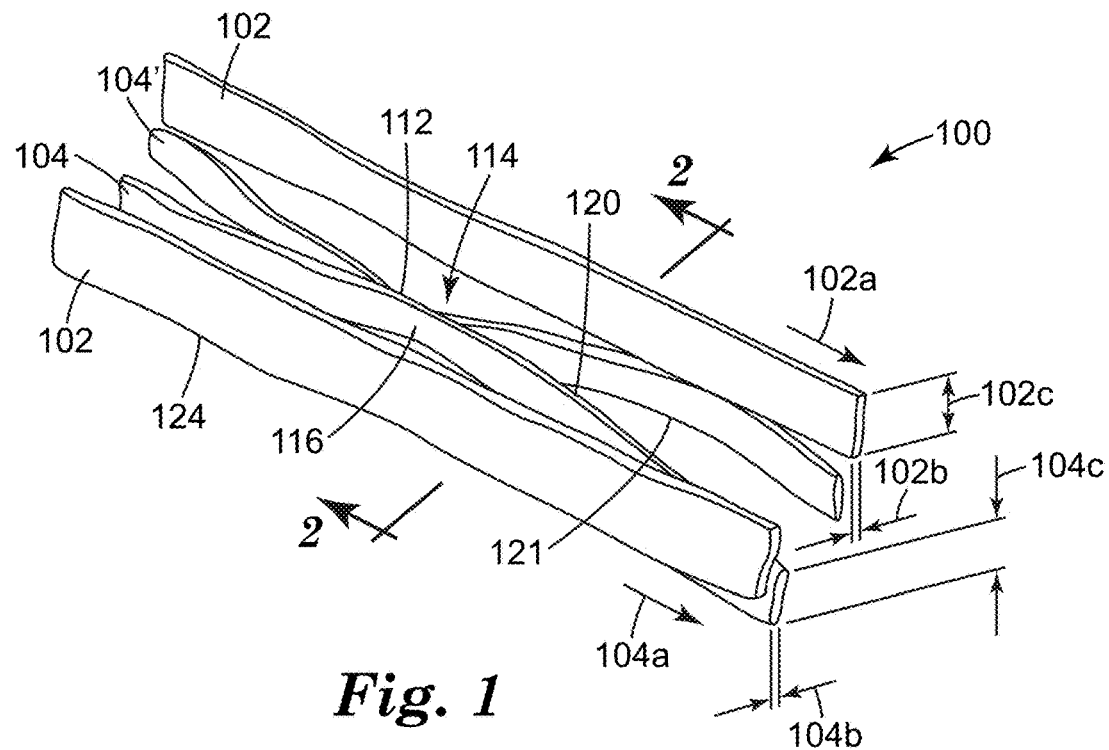
Fig. 1
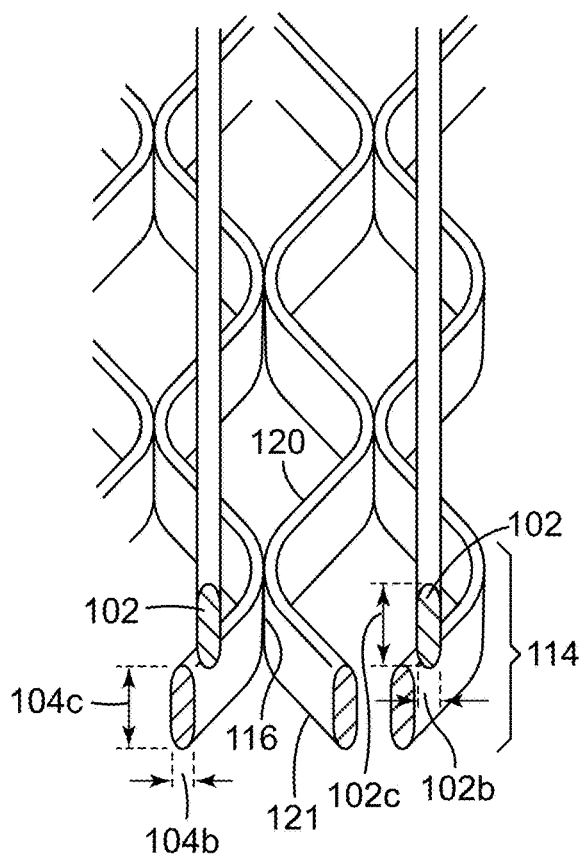
Fig. 2A (Proposed)
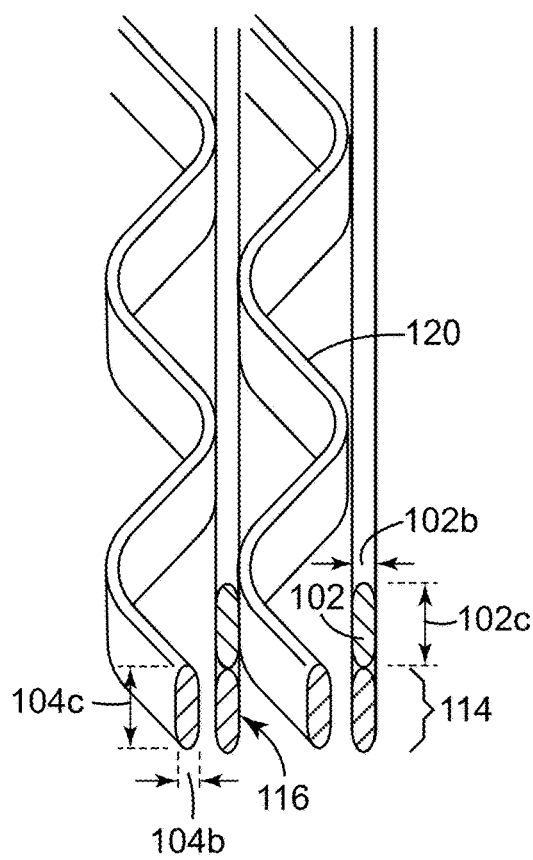
Fig. 2B (Proposed)

250μm

250μm

POLYMERIC NETTING WITH RIBBONS AND STRANDS, AND METHODS OF MAKING THE SAME

CROSS REFERENCE TO RELATED APPLICATIONS

This application is a national stage filing under 35 U.S.C. 371 of PCT/US2015/066254, filed Dec. 17, 2015, which claims the benefit of U.S. Provisional Application No. 62/096,630, filed Dec. 24, 2014, the disclosure of which is incorporated by reference in its/their entirety herein.

BACKGROUND

Polymeric nets are used for a wide variety of applications, including reinforcement of paper articles or inexpensive textiles (e.g., in sanitary paper articles, paper cloth, and heavy duty bags), non-woven upholstery fabrics, window curtains, decorative netting, wrapping material, mosquito netting, protective gardening netting against insects or birds, backing for growing of grass or plants, sport netting, light fishing netting, and filter materials.

Extrusion processes for making polymeric nets are known in the art. For example, recently extrusion dies and methods using a plurality of shims have been reported to be capable of producing polymeric netting having a thickness up to 750 micrometers. The polymeric strands of the netting are described as being periodically joined together at bond regions throughout the array (see U.S. Pat. Pub. No. 2014/234606 (Ausen et al.), US2014/220328 (Ausen et al.), and US2014/234605 (Ausen et al.). Also, an extruded article including an undulating strand with an aspect ratio of at least about 2:1 is disclosed in U.S. Pat. No. 4,634,485 (Welygan et al.).

Alternative polymeric netting configurations are desired and may be particularly useful for some applications.

SUMMARY

The present disclosure provides a polymeric netting comprising polymeric ribbons and polymeric strands, each of the polymeric ribbons and polymeric strands having a length, a width, and a thickness, wherein the length is the longest dimension and the width is the shortest dimension, wherein a plurality of the polymeric strands are bonded together to form a netting layer, wherein adjacent polymeric strands in the netting layer are bonded intermittently at multiple locations along their respective lengths, wherein the netting layer has first and second opposing major surfaces, wherein the polymeric ribbons have a thickness-width aspect ratio of at least 2:1 (in some embodiments, at least 3:1) and a minor surface defined by their width and length, and wherein the minor surface of a plurality of the polymeric ribbons is bonded to the first major surface of the netting layer.

In another aspect, the present disclosure describes an extrusion die comprising at least one cavity, a dispensing surface, and fluid passageways between the at least one cavity and the dispensing surface, wherein the dispensing surface has an array of first dispensing orifices separated by an array of second dispensing orifices and an array of third dispensing orifices disposed above or below the array of the first dispensing orifices and the array of the second dispensing orifices, wherein the first, second, and third dispensing orifices each have a height and a width, wherein the third dispensing orifices each have a height-to-width aspect ratio of at least 5:1, and wherein at least one third dispensing orifice is disposed either completely above or below the first dispensing orifices.

In another aspect, the present disclosure provides a method of making a polymeric netting described herein, the method comprising:

providing an extrusion die described herein;

dispensing first polymeric strands from the first dispensing orifices at a first speed while simultaneously dispensing second polymeric strands from the second dispensing orifices at a second speed to provide a netting layer having first and second major surfaces, wherein the second speed is at least twice the first speed; and simultaneously dispensing polymeric ribbons from the third dispensing orifices onto the first major surface of the netting layer.

In this application:

"elastic" refers to any material (such as a film that is 0.002 mm to 0.5 mm thick) that exhibits recovery from stretching or deformation. In some embodiments, a material may be considered to be elastic if, upon application of a stretching force, it can be stretched to a length that is at least 25 (in some embodiments, at least 50) percent greater than its initial length and can recover at least 40 percent of its elongation upon release of the stretching force.

"elongation" in terms of percent refers to {(the extended length–the initial length)/the initial length} multiplied by 100.

"major surface of a polymeric ribbon is a surface defined by the height and the length of the ribbon.

"netting" is used to describe the constructions herein since there are spaces between the ribbons and strands, for example, between the regions where they are bonded together.

"ribbon" refers to longitudinally extending elements in the polymeric netting having a generally rectangular or oblong cross section. There may be ribbons in the polymeric nettings disclosed herein other than those having a height-to-width aspect ratio of at least 3:1, at least 5:1, or at least 7:1. In other words, not all elements in the polymeric netting having rectangular cross sections are required to have a height-to-width aspect ratio of at least 3:1, at least 5:1, or at least 7:1. The polymeric strands may also have rectangular cross sections.

Polymeric nettings described herein are useful, for example, in an absorbent article. For example, an absorbent article comprising the polymeric netting described herein, a liquid impermeable backsheet, and an absorbent core, wherein the absorbent core is between the polymeric netting and the backsheet, the polymeric netting is between the absorbent core and the backsheet, or the polymeric netting is within the absorbent core.

BRIEF DESCRIPTION OF THE DRAWINGS

FIG. 1 is perspective view of an exemplary embodiment of a polymeric netting described herein.

FIG. 2 is schematic cross-sectional view of a plane of an exemplary embodiment of a polymeric netting described herein, in which the polymeric netting is provided with a louver-like ribbon.

FIGS. 2A and 2B are perspective views of the exemplary netting shown in FIG. 2.

DETAILED DESCRIPTION

Figure 3:
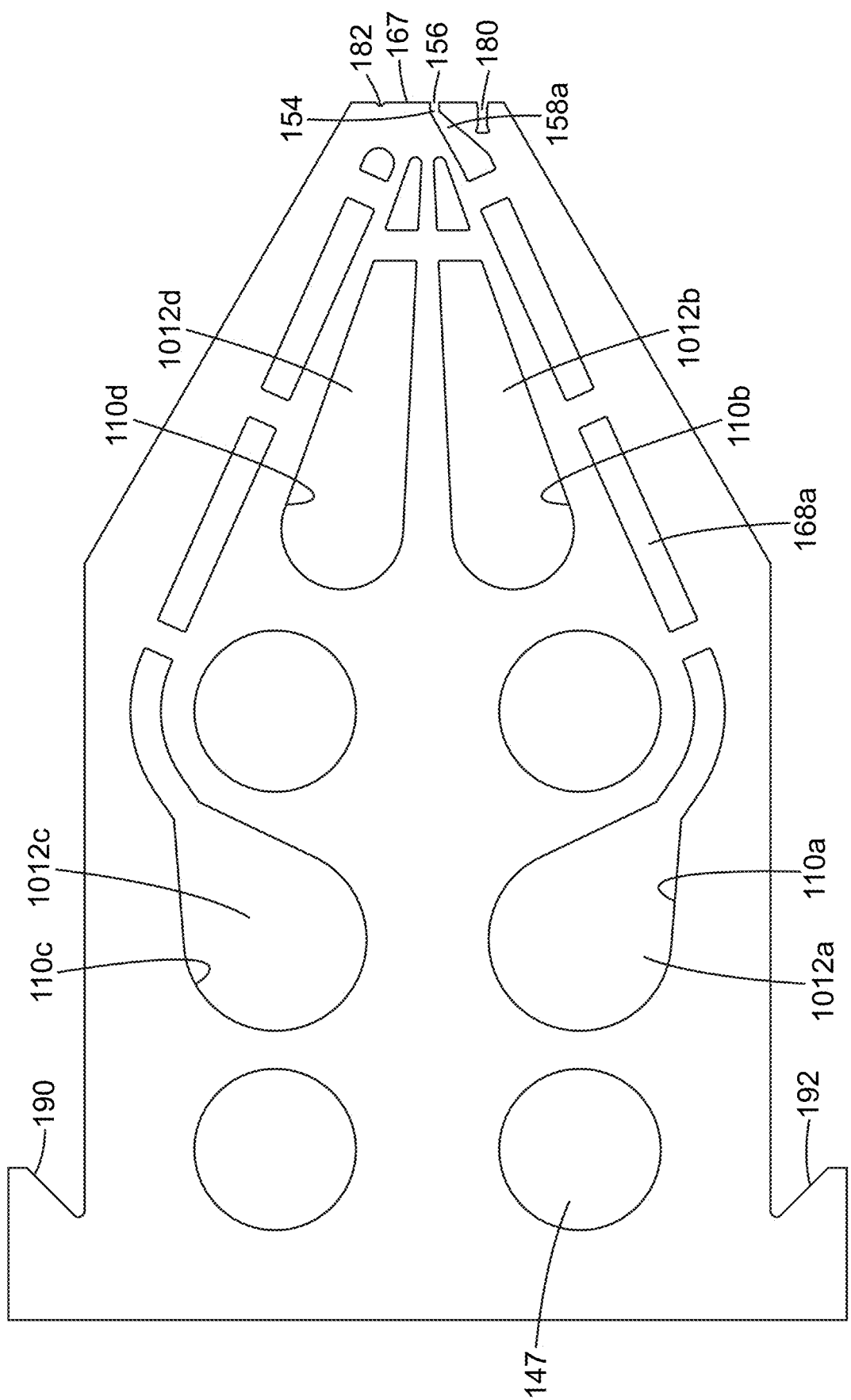
FIG. 3 is a plan view of an exemplary embodiment of a shim suitable for use in a sequence of shims capable of forming a polymeric netting of FIG. 1.

Referring to FIGS. 1, 2, 2A, and 2B, exemplary polymeric netting 99 comprises polymeric ribbons 102 and polymeric strands 104 and 104'. Strands 104 and 104' may be of the same or different materials and/or the same or different dimensions. Each polymeric ribbon 102 and polymeric strand 104 have a length, a width, and a thickness (e.g., length 102a, 104a, width, 102b, 104b, and thickness 102c, 104c), wherein the length is the longest dimension and the width is the shortest dimension, the length and the width are perpendicular to each other, and the thickness is perpendicular to the length and the width. Polymeric strands 104, 104' are bonded together at 112 to form netting layer 114. Adjacent polymeric strands in netting layer 114 are bonded intermittently at multiple locations 116 along their respective lengths. Netting layer 114 has first and second opposing major surfaces 120, 121. Polymeric ribbons 102 have a thickness-to-width aspect ratio of at least 2:1 (in some embodiments, at least 3:1) and minor surface 124 defined by their width and length. Minor surface 124 of a plurality of polymeric ribbons 110 is bonded to first major surface 120 of netting layer 114.

In some embodiments, each polymeric ribbons is bonded to only one of the polymeric strands. In some embodiments, each polymeric ribbon is intermittently bonded to a strand. In some embodiments, each polymeric ribbon is continuously bonded along the length of a strand. In some embodiments, at least some of the polymeric ribbons have a width that is smaller than a width of at least some of the polymeric strands. In some embodiments, at least some of the polymeric ribbons have a height that is greater than a height of at least some of the polymeric strands. In some embodiments, the minor surface of a second plurality of the polymeric ribbons is bonded to the second major surface of the netting layer.

Netting described herein can be made by a method comprising:

providing an extrusion die described herein;

dispensing first polymeric strands from the first dispensing orifices at a first speed while simultaneously dispensing second polymeric strands from the second dispensing orifices at a second speed to provide a netting layer having first and second major surfaces, wherein the second speed is at least twice the first speed; and simultaneously dispensing polymeric ribbons from the third dispensing orifices onto the first major surface of the netting layer.

Although other methods may be useful, the polymeric nettings disclosed herein in any of their embodiments can conveniently be prepared by an extrusion die and/or method according to the present disclosure. The extrusion die according to the present disclosure has a variety of passageways from cavities within the die to dispensing orifices. The dispensing orifices each have a width, which is the dimension that corresponds to the width of a particular polymeric ribbon or polymeric strand, and a height, which is the dimension that corresponds to the thickness of the resulting extruded polymeric netting and the height of a particular polymeric ribbon or polymeric strand.

In the extrusion die and method of making a polymeric netting according to the present disclosure, the extrusion die has at least one cavity, a dispensing surface, and fluid passageways between the at least one cavity and the dispensing surface. The dispensing surface has an array of first dispensing orifices separated by an array of second dispensing orifices. This means that for any two first dispensing orifices, there is at least one second dispensing orifice between them. However, it is possible that for any two first dispensing orifices, there is more than one second dispensing orifice between them, and there may be dispensing orifices other than the second dispensing orifices between them in a side-by-side configuration.

The fluid passageways are capable of physically separating the polymers from the at least one cavity (e.g., first and second cavities and optionally any further die cavities within the extrusion die) until the fluid passageways enter the dispensing orifices. The shape of the different passageways within the die may be identical or different. Examples of passageway cross-sectional shapes include round, square, and rectangular shapes. These cross-sectional shapes, selection of polymeric material, and die swell can influence the cross-sectional shape of the ribbons and strands.

In some embodiments, a majority of the third dispensing orifices are disposed either completely above or below the first dispensing orifices. In some embodiments, a majority of the third dispensing orifices are disposed completely above the first dispensing orifices. In some embodiments, a majority of the third dispensing orifices are disposed completely below the first dispensing orifices. In some embodiments, all of the third dispensing orifices are disposed either completely above or below the first dispensing orifices. In some embodiments, all of the third dispensing orifices are disposed completely above the first dispensing orifices. In some embodiments, all of the third dispensing orifices are disposed completely below the first dispensing orifices.

In some embodiments, the first dispensing orifices and second dispensing orifices are arranged in a single row across the dispensing surface.

In some embodiments, the extrusion die comprises at least a first and second cavity, first fluid passageways between the first cavity and the first dispensing orifices, and second fluid passageways between the second cavity and the second dispensing orifices.

In some embodiments, the extrusion die comprises at least a first cavity, a second cavity, and a third cavity, first fluid passageways between the first cavity and the first dispensing orifices, second fluid passageways between the second cavity and the second dispensing orifices, and third fluid passageways between the third cavity and the third dispensing orifices.

In some embodiments of the method according to the present disclosure, polymeric ribbons are dispensed from the first dispensing orifices at a first speed while simultaneously polymeric strands are dispensed from the second dispensing orifices at a second speed, and the second speed is at least 2 times the first speed. In some embodiments, the second speed is in a range from 2 to 6 or 2 to 4 times the first speed. In some embodiments in which the extrusion die includes at least first and second cavities, the first cavity of the extrusion die is supplied with a first polymeric composition at a first pressure so as to dispense the polymeric ribbons from the array of first dispensing orifices at a first speed, the second cavity of the extrusion die is supplied with a second polymeric composition at a second pressure so as to dispense the polymeric strands from the array of second dispensing orifices at a second speed, wherein the second speed is at least 2 (in some embodiments, 2 to 6, or 2 to 4) times the first speed.

While either the polymeric ribbons or polymeric strands may be made to oscillate, typically larger bond areas are observed when the polymeric strands are oscillating. Therefore, in the methods described below, the polymeric strand is described as the oscillating strand.

The size of the polymeric ribbons and polymeric strands can be adjusted, for example, by the composition of the extruded polymers, velocity of the extruded strands, and/or the orifice design (e.g., cross sectional area (e.g., height and/or width of the orifices)). As taught, for example, in U.S. Pat. Pub. No. 2014/234606 (Ausen et al.), a dispensing surface with a first polymer orifice three times greater in area than the second polymer orifice may not generate a net with polymeric ribbons with a height greater than the polymeric stands depending on the identity of the polymeric compositions and the pressure within the cavities. In the embodiments of the extrusion die and method according to the present disclosure, the height-to-width aspect ratio of the orifices is at least 5:1.

Conveniently, the extrusion die according to and/or useful for practicing the present disclosure may be comprised of a plurality of shims. The plurality of shims together define the at least one cavity, the dispensing surface, and the fluid passageways between the at least one cavity and the dispensing surface. In some embodiments, the plurality of shims comprises a plurality of sequences of shims wherein each sequence comprises at least one first shim that provides a first fluid passageway between the at least one cavity and at least one of the first dispensing orifices, and at least one second shim that provides a second fluid passageway between the at least one cavity and at least one of the second dispensing orifices. In some embodiments, the shims together define a first cavity and a second cavity, the extrusion die having a plurality of first dispensing orifices in fluid communication with the first cavity and having a plurality of second dispensing orifices in fluid communication with the second cavity.

In some embodiments, the shims will be assembled according to a plan that provides a sequence of shims of diverse types. Since different applications may have different requirements, the sequences can have diverse numbers of shims. The sequence may be a repeating sequence that is not limited to a particular number of repeats in a particular zone. Or the sequence may not regularly repeat, but different sequences of shims may be used.

Figure 4:
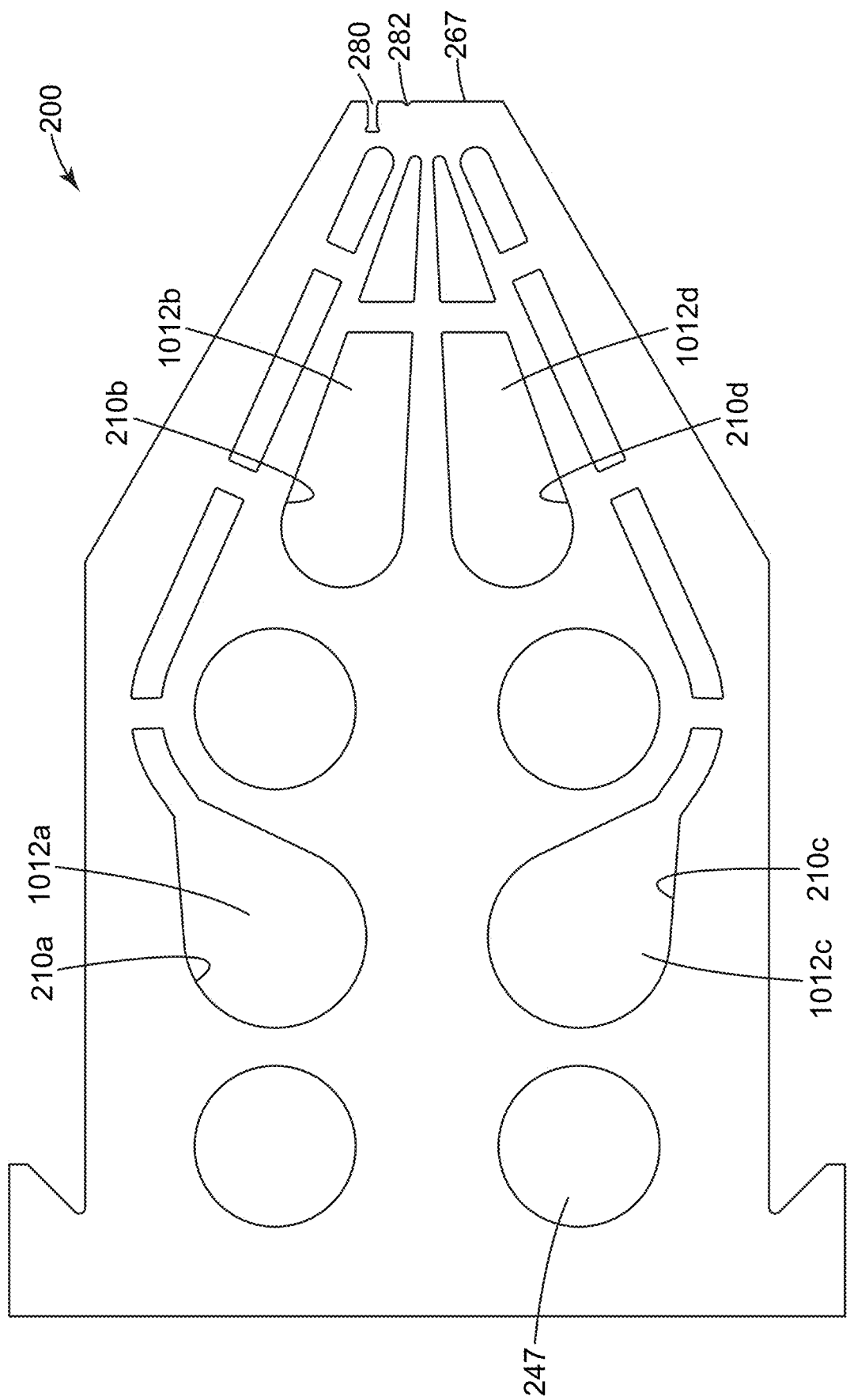
FIG. 4 is a plan view of another exemplary embodiment of a shim suitable for use in a sequence of shims such as that shown in FIG. 3.
Figure 5:
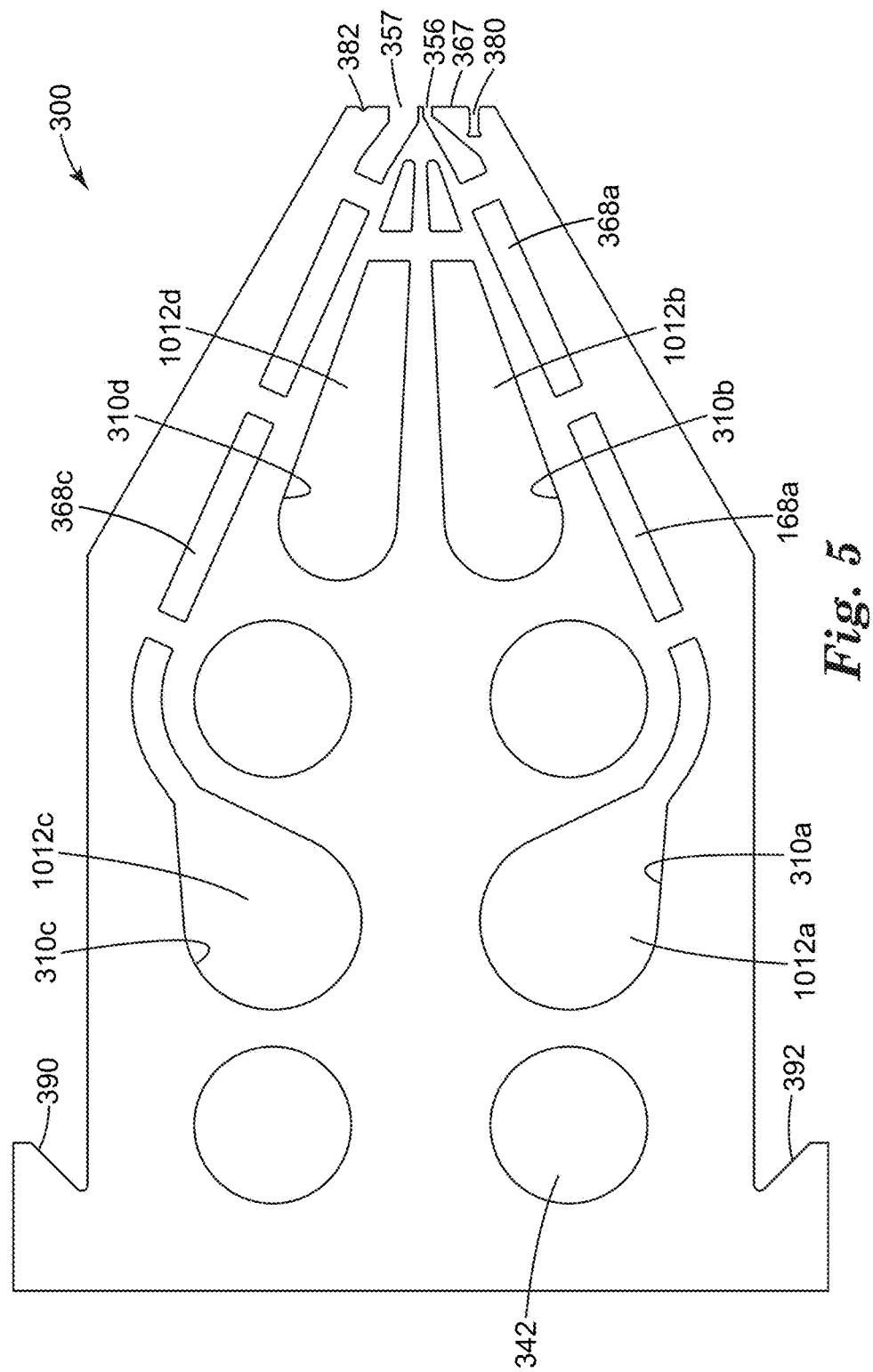
FIG. 5 is a plan view of another exemplary embodiment of a shim suitable for use in a sequence of shims such as that shown in FIG. 3.
Figure 6:
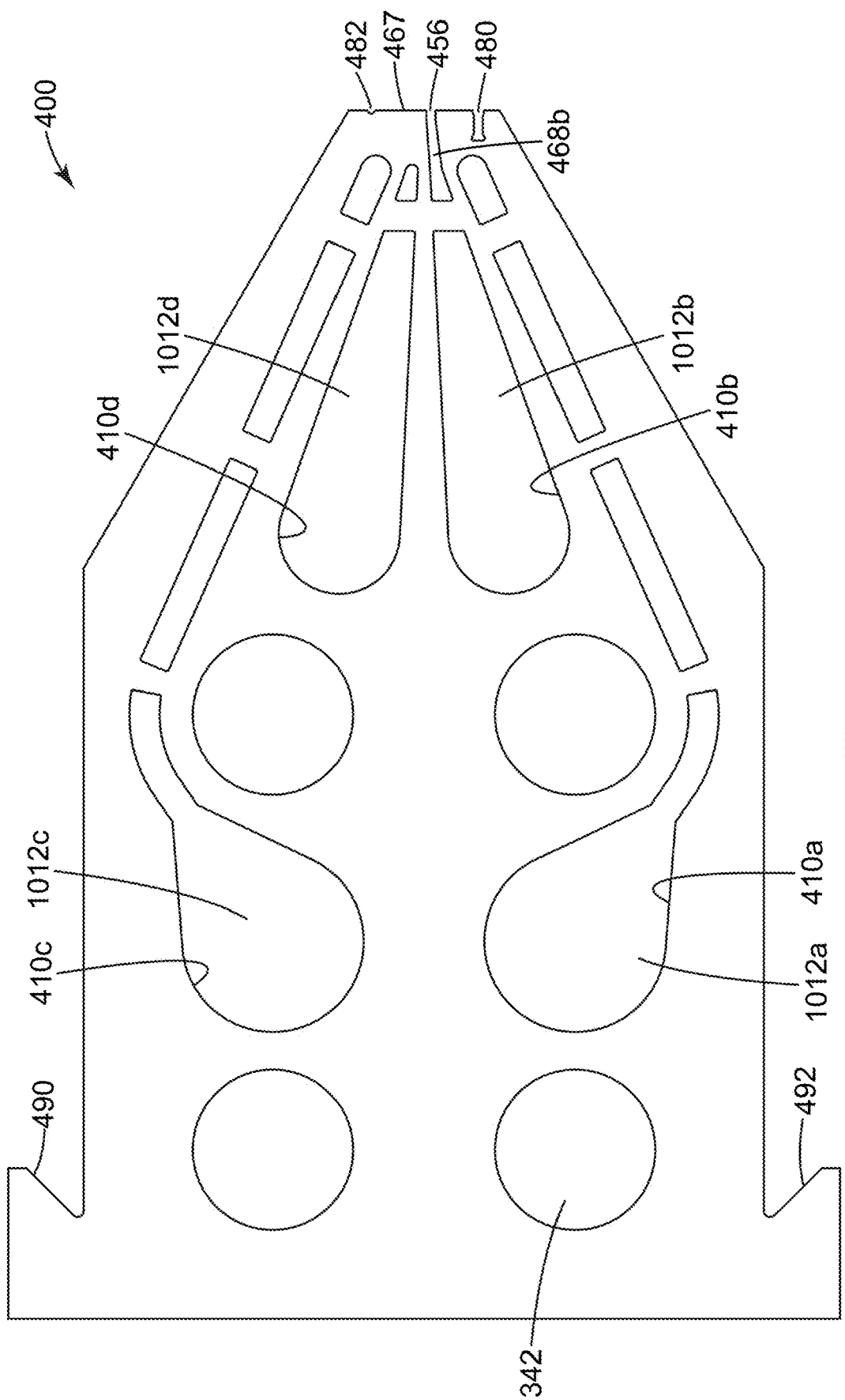
FIG. 6 is a plan view of another exemplary embodiment of a shim suitable for use in a sequence of shims such as that shown in FIG. 3.

A plurality of shims that is useful for providing a polymeric netting according to the present disclosure is shown in FIGS. 3 to 7. Referring now to FIG. 3, a plan view of shim 100 is illustrated. Shim 100 is useful in a sequence of shims 1000 shown in FIG. 7. Other shims useful in this sequence are shown in FIGS. 4, 5, and 6. Shim 100 has first aperture 110a, second aperture 110b, third aperture 110c and fourth aperture 110d. When shim sequence 1000 is assembled, first apertures 110a, 210a, and 310a and 410a in shims 100, 200, 300 and 400 together define at least a portion of first cavity 1012a. Similarly, second apertures 110b, 210b, 310b, and 410b in shims 100, 200, 300, and 400 together define at least a portion of second cavity 1012b; third apertures 110c, 210c, 310c, and 410c in shims 100, 200, 300, and 400 together define at least a portion of third cavity 1012c; and fourth apertures 110d, 210d, 310d, and 410d in shims 100, 200, 300, and 400 together define at least a portion of fourth cavity 1012d. Shim 100 has several holes 147 to allow the passage of, for example, bolts to hold shim 100 and others to be described below into an assembly. Shim 100 has dispensing surface 167, and in this particular embodiment, dispensing surface 167 has indexing groove 180, which is useful for conveniently aligning the shims with an appropriately shaped key during assembly of the shims into a die, and identification notch 182 to help verify that the die has been assembled in the desired manner. Shim 100 has shoulders 190 and 192, which can be conveniently engaged by compression blocks 2204 described below in connection with FIGS. 8 and 9. Shim 100 has dispensing opening 156 but no integral connection between dispensing opening 156 and any of apertures 110a, 110b, 110c, or 110d. There is no connection, for example, from cavity 110a to dispensing opening 156, via, for example, passageway 168a, but the flow has a route 1068a to the dispensing surface when shim 100 is assembled with shims 200 and 300 and 400 as illustrated in assembly drawing 1000 (see FIG. 7). The dimensions of duct 154, and especially dispensing opening 156 at its end, can be designed to provide the dimensions desired in the polymer strands extruded from them. The dimensions of dispensing opening 156 and the dimensions of passageway 158a also influence the desired strand speed.

Figure 7:
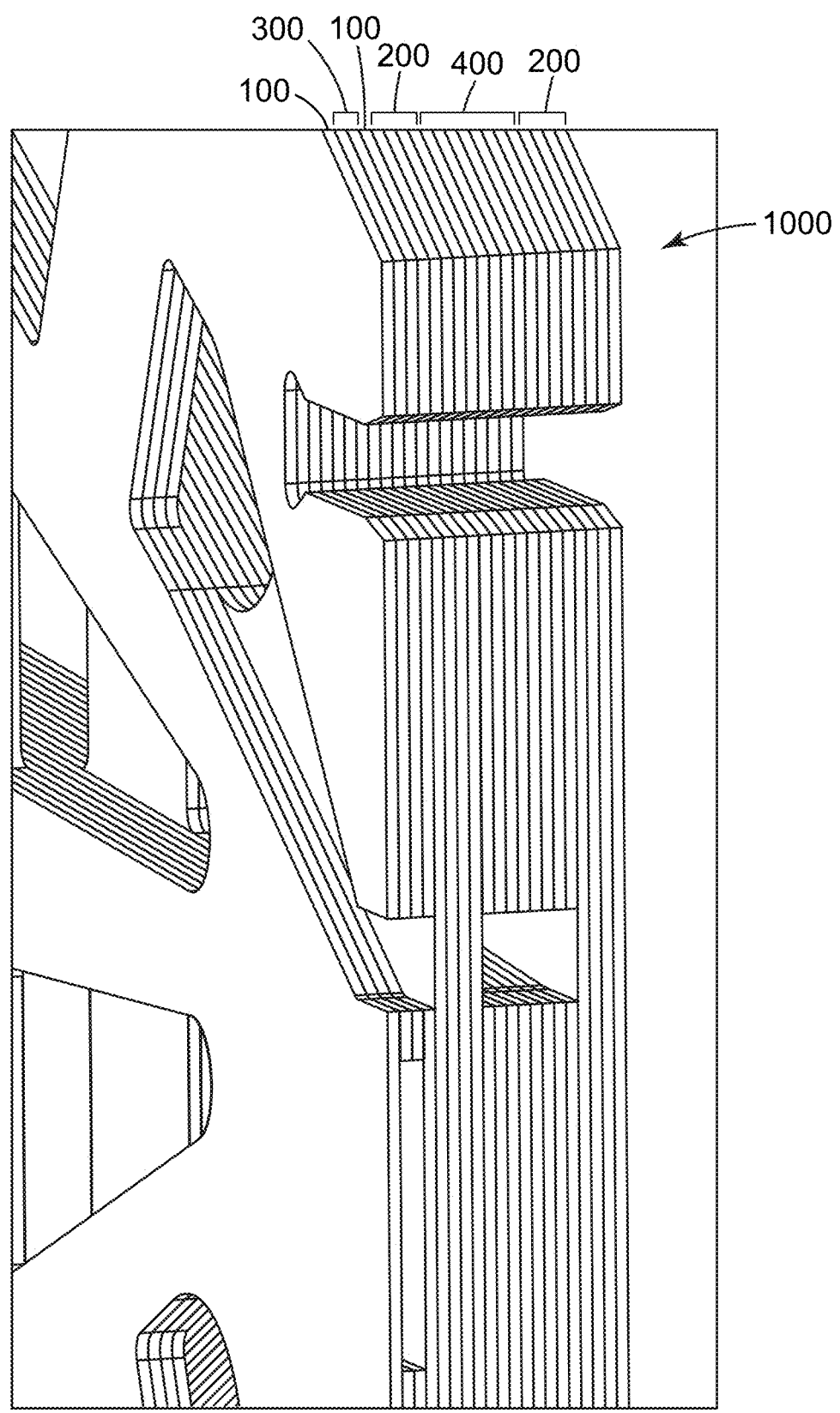
FIG. 7 is a perspective detailed view of a sequence of shims using the shims of FIGS. 3-6 suitable to form a polymeric netting according to FIG. 1.

Referring now to FIG. 4, a plan view of shim 200 is illustrated. Shim 200 has first aperture 210a, second aperture 210b, third aperture 210c, and forth aperture 210d. When shim 200 is assembled with others as shown in FIG. 7, aperture 210a helps define first cavity 1012a, aperture 210b helps define second cavity 1012b, aperture 210c helps define third cavity 1012c and aperture 210d helps define fourth cavity 1012d. Shim 200 has several holes 247 to allow the passage of, for example, bolts to hold shim 200 and others to be described below into an assembly. Shim 200 has dispensing surface 267, and in this particular embodiment, dispensing surface 267 has indexing groove 280 and identification notch 282. Shim 200 also has shoulders 290 and 292. There is no passage from any of the cavities to dispensing surface 267 since this shim creates a non-dispensing area along the width of the die. In use shim(s) 200 separates shims 100 and 300 producing polymeric strands 104' and louver-like ribbons 102 from shims 400 producing polymeric strands 104.

Referring now to FIG. 5, a plan view of shim 300 is illustrated. Shim 300 has first aperture 310a, second aperture 310b, third aperture 310c, and fourth aperture 310d. When shim 300 is assembled with others as shown in FIG. 7, aperture 310a helps define first cavity 1012a, aperture 310b helps define second cavity 1012*b*, aperture 310*c* helps define third cavity 1012*c*, and aperture 310*d* helps define fourth cavity 1012*d*. Shim 300 has several holes 347 to allow the passage of, for example, bolts to hold shim 300 and others to be described below into an assembly. Shim 300 has dispensing surface 367, and in this particular embodiment, dispensing surface 367 has indexing groove 380 and identification notch 382. Shim 300 also has shoulders 390 and 392. Shim 300 has dispensing opening 356 but no direct integral connection between dispensing opening 356 and any of apertures 310*a*, 310*b*, 310*c*, and 310*d*. While, there is no connection within shim 300, for example, from aperture 310*a* to dispensing opening 356, via, for example, passageway 368*a*, but the flow has a route 1068*a* to the dispensing surface when shim 300 is assembled with shims 100, 200, and 400 as illustrated in sequence 1000 (see FIG. 7). Dispensing surface 367 also has dispensing opening 357 which similarly has a connection to cavity 1012*c* through the third dimension by a path that includes passageway 368*c*. Material dispensed from dispensing opening 357 will form louver-like ribbons during operation of the die.

Referring now to FIG. 6, a plan view of shim 400 is illustrated. Shim 400 has first aperture 410*a*, second aperture 410*b*, third aperture 410*c*, and fourth aperture 410*d*. When shim 400 is assembled with others as shown in FIG. 7, aperture 410*a* helps define first cavity 1012*a*, aperture 410*b* helps define second cavity 1012*b*, aperture 410*c* helps define third cavity 1012*c*, and aperture 410*d* helps define fourth cavity 1012*d*. Shim 400 has several holes 447 to allow the passage of, for example, bolts to hold shim 400 and others described above into an assembly. Shim 400 has dispensing surface 467, and in this particular embodiment, dispensing surface 467 has indexing groove 480 and identification notch 482. Shim 400 also has shoulders 490 and 492. Shim 400 has dispensing opening 456 but no direct integral connection between dispensing opening 456 and any of apertures 410*a*, 410*b*, 410*c*, and 410*d*. While there is no connection entirely within shim 400, for example, from aperture 410*b* to dispensing opening 456, via, for example, passageway 468*b*, the flow has a route 1068*b* to the dispensing surface when shim 400 is assembled with shims 100, 200, and 300 as illustrated in sequence 1000 (see FIG. 7).

FIG. 7 illustrates a perspective assembly drawing of a sequence of shims, collectively 1000, employing the shims of FIGS. 3 to 6 so as to produce a polymeric netting 99 as shown in FIG. 1. Proceeding left to right, sequence 1000 includes one shim 100 that contribute to strands 104, two shims 300 that contribute to stands 104' and louver-like ribbons 102, one shim 100, four shims 200 that act as separators, eight shims 400 which extrude strands 104, and four shims 200 that act as separators. When an extrusion die (2000) is assembled as discussed below in connection with FIGS. 8 and 9 comprising multiple instances of the sequence of shims 1000, that die will comprise at least one cavity (more than one cavity in the depicted embodiment, including 1012*a*, 1012*b*, and 1012*c*). It will have a dispensing surface (defined collectively by dispensing surfaces 167, 267, 367, and 467). It will have fluid passageways between the at least one cavity and the dispensing surface (more than one fluid passageway in the depicted embodiment, including 1068*a*, 1068*b*, and 1068*c*). The collective dispensing surface of the die will have an array of first dispensing orifices (defined collectively by dispensing orifices 356 on diverse shims 300) separated by an array of second dispensing orifices (defined collectively by dispensing orifices 456 on diverse shims 400) and an array of third dispensing orifices disposed above or below the array of the first dispensing orifices and the array of the second dispensing orifices (defined collectively by dispensing orifices 357 on diverse shims 300). The first, second, and third dispensing orifices each have a height and a width, wherein the third dispensing orifices each have a height-to-width aspect ratio of at least 5:1, and wherein at least one third dispensing orifice is disposed either completely above or below the first dispensing orifices.

Figure 8:
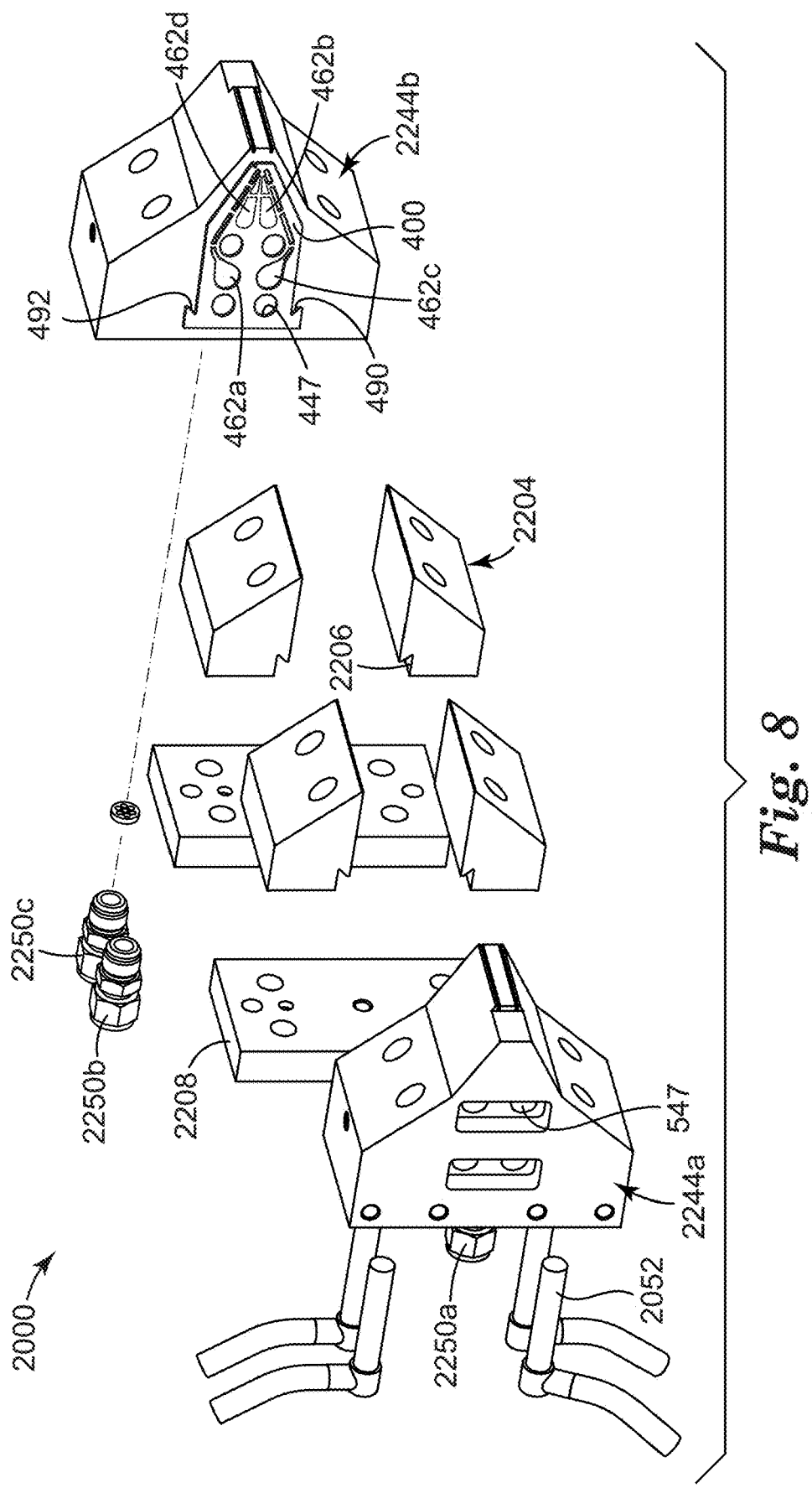
FIG. 8 is an exploded perspective view of an extrusion die employing the sequence of shims of FIG. 7.
Figure 9:
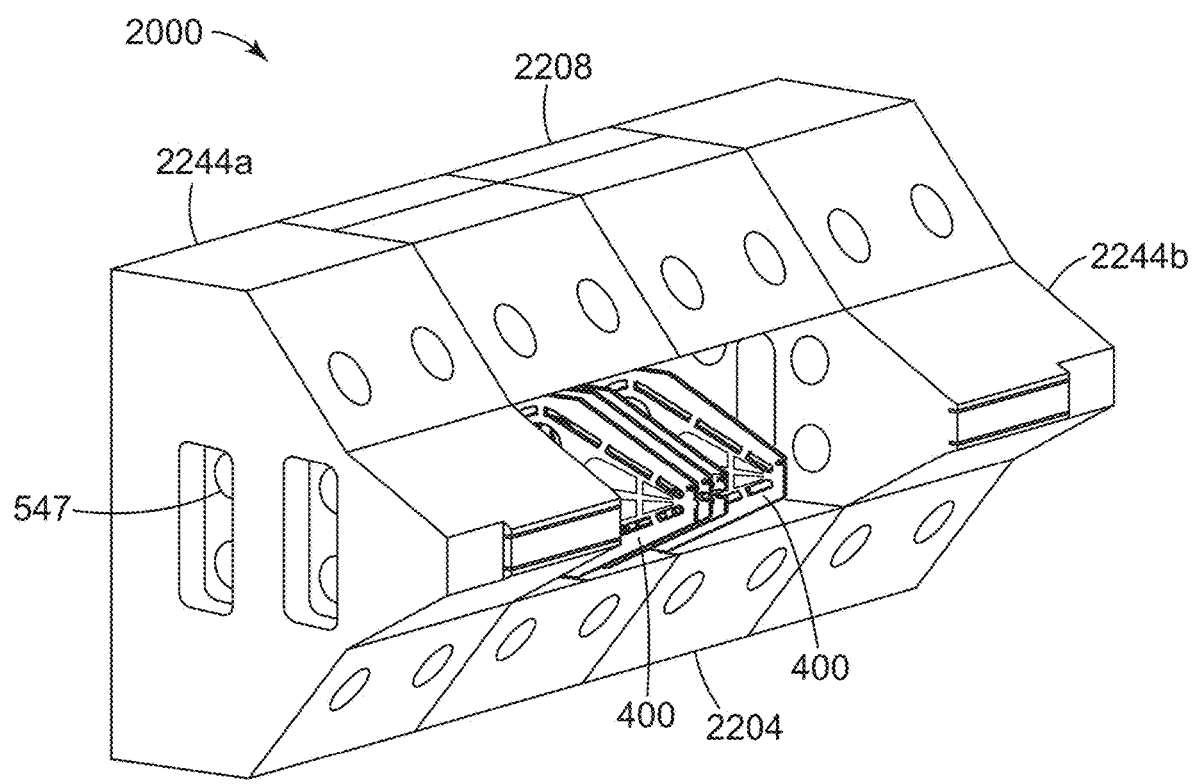
FIG. 9 is a perspective view of the extrusion die of FIG. 8, partially assembled.

An exploded perspective view of an embodiment of a mount suitable for an extrusion die composed of multiple repeats of the sequence of shims is illustrated in FIGS. 8 and 9. In some embodiments of extrusion dies described herein, there will be a large number of very thin shims (typically several thousand shims; in some embodiments, at least 1000, 2000, 3000, 4000, 5000, 6000, 7000, 8000, 9000, or even at least 10,000), of diverse types (e.g., shims 100, 200, 300, and 400), compressed between two end blocks (e.g., 2244*a* and 2244*b*). Conveniently, through bolts can be used to assemble the shims to the end blocks 2244*a* and 2244*b*, passing through holes 447 (*typ*) in the shims. Inlet fittings 2250*a*, 2250*b*, and 2250*c* and 2250*d* (not shown) are provided on end blocks 2244*a* and 2244*b* respectively to introduce the materials to be extruded into extrusion die 2000. In some embodiments, inlet fittings 2250*a*, 2250*b*, and 2250*c* and 2250*d* are connected to melt trains of conventional type. In some embodiments, cartridge heaters 2052 are inserted into receptacles extrusion die 2000 to maintain the materials to be extruded at a desirable temperature while in the die. The ordinary artisan may perceive alternatives for assembling the extrusion die other than that shown in the illustrated embodiment. In some embodiments, the assembled shims (conveniently bolted between the end blocks) further comprise a manifold body (not shown) for supporting the shims. The manifold body has at least one (or more (e.g., two or three, four, or more)) manifold therein, the manifold having an outlet. An expansion seal (e.g., made of copper or alloys thereof) is disposed so as to seal the manifold body and the shims, such that the expansion seal defines a portion of at least one of the cavities (in some embodiments, a portion of all the cavities), and such that the expansion seal allows a conduit between the manifold and the cavity.

Compression blocks 2204 have a notch 2206 that conveniently engages the shoulders on the shims (e.g., 490 and 492 on 400). When mount 2000 is completely assembled, compression blocks 2204 are attached by, for example, machine bolts to backplates 2208. Referring now to FIG. 9, a perspective view of mount 2000 of FIG. 8 is illustrated in a partially assembled state. A few shims (e.g., 400) are in their assembled positions to show how they fit within mount 2000, but most of the shims that would make up an assembled die have been omitted for visual clarity.

In any of the shims and sequences described above, the shims can have thicknesses in the range from 50 micrometers to 500 micrometers, although thicknesses outside of this range may also be useful. For wider fluid passageways and dispending orifices, several smaller thickness shims may be stacked together, or single shims of the desired passageway width may be used. The shims are typically metal, for example, stainless steel. To reduce size changes with heat cycling, metal shims are typically heat-treated. The shims can be made by conventional techniques, including wire electrical discharge and laser machining. Often, a plurality of shims are made at the same time by stacking a plurality of sheets and then creating the desired openings simultaneously. Variability of the flow channels is preferably within 0.025 mm (1 mil), more preferably, within 0.013 mm (0.5 mil). The shims are tightly compressed to prevent gaps between the shims and polymer leakage. For example, 12 mm (0.5 inch) diameter bolts are typically used and tightened, at the extrusion temperature, to their recommended torque rating. Also, the shims are aligned to provide uniform extrusion out the extrusion orifice, as misalignment can lead to strands extruding at an angle out of the die which inhibits desired bonding of the net. As described above, to aid in alignment, an indexing groove can be cut into the shims to receive an alignment key. Also, a vibrating table can be useful to provide a smooth surface alignment of the extrusion tip.

Typically, the fluid passageways have heights in a range from 50 micrometers to 3 mm, and lengths less than 5 mm (with generally a preference for smaller lengths for decreasingly smaller passageway thicknesses), although heights and lengths outside of these ranges may also be useful. The height of the first dispensing orifices may be in a range from 50 micrometers to 3 millimeters (mm). In some embodiments, the height of the first dispensing orifices is greater than 750 micrometers. In some of these embodiments, the height of the first dispensing orifices is in a range from greater than 750 micrometers to 3 mm (e.g., 0.775 mm to 3 mm or 0.8 mm to 2.6 mm). In some embodiments, the height of at least one of the first dispensing orifices or the second dispensing orifices is less than 750 micrometers. In some of these embodiments, the height of the first dispensing orifices and second dispensing orifices is in a range from 0.1 mm to less than 750 micrometers (e.g., 0.3 mm to 0.745 mm or 0.5 mm to 0.745 mm).

In some embodiments of the dies useful for extruding a polymer, each of the first and the second dispensing orifices have a width, and each of the first and the second dispensing orifices are separated by at least the width of the respective dispensing orifice and up to 2 times the width of the respective dispensing orifice. When the dispensing orifices have different widths, the separation between the first and second orifices may be at least the width of the wider opening and up to 2 times the width of the wider opening. The spacing between orifices should be sufficient to maintain a distance between adjacent strands as they exit the die. This spacing accommodates die swell at the dispensing tip. If the spacing between orifices is too great, the strands and ribbons after extrusion at different speeds will not repeatedly collide with each other and will not form the repeating bonds of the polymeric netting.

In general, it has been observed that the rate of strand bonding is proportional to the extrusion speed of the polymeric strands or ribbons that are extruded at the faster speed. Further, it has been observed that this bonding rate can be increased, for example, by increasing the polymer flow rate for a given orifice size, or by decreasing the orifice area for a given polymer flow rate. It has also been observed that the distance between bonds is inversely proportional to the rate of strand bonding, and proportional to the speed that the net is drawn away from the die. Thus, it is believed that the distance between bonds and the net basis weight can be independently controlled by design of the orifice cross sectional area, the takeaway speed, and the extrusion rate of the polymer. For example, relatively high basis weight nettings, with a relatively short bond pitch can be made by extruding at a relatively high polymer flow rate, with a relatively low netting takeaway speed, using a die with a relatively small second orifice area.

Although in the embodiments shown in FIGS. 3 to 9, the first and second dispensing orifices are collinear, this is not a requirement. In some embodiments, the first dispensing orifices are collinear with each other, and the second dispensing orifices are collinear with each other, but the first and second dispensing orifices do not overlap. When the first and second dispensing orifices do not overlap with each other, it may be desirable to extrude the strands horizontally.

While the embodiments of the extrusion die and method described above in connection with FIGS. 3 to 9 supply polymeric ribbons and polymeric strands of a polymer netting from separate cavities, other embodiments include providing an extrusion die comprising a plurality of shims positioned adjacent to one another, the shims together defining a cavity, the extrusion die having a plurality of first dispensing orifices in fluid communication with the cavity and a plurality of second dispensing orifices in fluid communication with the cavity, such that the first and second dispensing orifices are alternated. In these embodiments, polymeric ribbons are dispensed from the first dispensing orifices at a first speed while simultaneously polymeric strands are dispensed from the second dispensing orifices at a second speed, wherein the second speed is at least 2 (in some embodiments, in a range from 2 to 6 or 4 to 6) times the first speed. Since there is only one cavity, the polymeric ribbons and polymeric strands in the resulting netting are made from the same composition. To prepare a polymeric netting from an extrusion die having only one cavity, a shim sequence such as that shown in FIGS. 44 to 48 in U.S. Pat. Pub. 2014/234606 (Ausen et al.) may be useful, with the modification that the shims providing the first dispensing orifices provide the polymeric ribbons have an aspect ratio of at least 5:1 and may lack a restriction set back from the dispensing orifice.

The polymeric compositions useful in the polymeric nettings and methods described above in any of their embodiments may be the same or different. In some embodiments, the polymeric ribbons and polymeric strands comprise different polymeric compositions. These nets can be prepared, for example, by extrusion using any embodiments of the method described above by using different polymeric compositions in the first and second cavities. The different polymeric compositions in the polymeric ribbons and polymeric strands may be selected for their surface properties or their bulk properties (e.g., tensile strength, elasticity, microstructure, color, refractive index, etc.). Furthermore, polymeric compositions can be selected to provide specific functional or aesthetic properties in the polymeric netting such as hydrophilicity/hydrophobicity, elasticity, softness, hardness, stiffness, bendability, or colors. The term "different" in terms of polymeric compositions can also refer to at least one of (a) a difference of at least 2% in at least one infrared peak, (b) a difference of at least 2% in at least one nuclear magnetic resonance peak, (c) a difference of at least 2% in the number average molecular weight, or (d) a difference of at least 5% in polydispersity. In some embodiments, at least the polymeric ribbons are elastic or the polymeric strands are elastic.

In any embodiments of the method disclosed herein, polymers used to make the polymeric ribbons and polymeric strands are selected to be compatible with each other such that the polymeric ribbons and polymeric strands bond together at bond regions. Bonding generally refers to melt-bonding, and the bonds between polymer strands and polymer ribbons can be considered to be melt-bonded. The bonding occurs in a relatively short period of time (typically less than 1 second). The bond regions on the major surface of the polymeric ribbons, as well as the polymeric strands, typically cool through air and natural convection and/or radiation. In selecting polymers for the polymeric ribbons and polymeric strands, in some embodiments, it may be desirable to select polymers of bonding strands that have dipole interactions (or H-bonds) or covalent bonds. Bonding between strands has been observed to be improved by increasing the time that the polymeric ribbons and polymeric strands are molten to enable more interaction between polymers. Bonding of polymers has generally been observed to be improved by reducing the molecular weight of at least one polymer and or introducing an additional co-monomer to improve polymer interaction and/or reduce the rate or amount of crystallization.

Examples of polymeric materials from which the polymeric netting can be made include thermoplastic polymers. Suitable thermoplastic polymers for the polymeric nettings include polyolefin homopolymers such as polyethylene and polypropylene, copolymers of ethylene, propylene and/or butylene; copolymers containing ethylene such as ethylene vinyl acetate and ethylene acrylic acid; ionomers based on sodium or zinc salts of ethylene methacrylic acid or ethylene acrylic acid; polyvinyl chloride; polyvinylidene chloride; polystyrenes and polystyrene copolymers (styrene-maleic anhydride copolymers, styrene acrylonitrile copolymers); nylons; polyesters such as poly(ethylene terephthalate), polyethylene butyrate and polyethylene napthalate; polyamides such as poly(hexamethylene adipamide); polyurethanes; polycarbonates; poly(vinyl alcohol); ketones such as polyetheretherketone; polyphenylene sulfide; polyacrylates; cellulosics; fluoroplastics; polysulfones; silicone polymers; and mixtures thereof. The die and method according to the present disclosure may also be useful for co-extruding polymeric materials that can be crosslinked (e.g., by heat or radiation). When a heat curable resin is used, the die can be heated to start the cure so as to adjust the viscosity of the polymeric material and/or the pressure in the corresponding die cavity. In some embodiments, at least one of the polymeric ribbons or polymeric strands is made from a polyolefin (e.g., polyethylene, polypropylene, polybutylene, ethylene copolymers, propylene copolymers, butylene copolymers, and copolymers and blends of these materials).

In some embodiments, the polymeric ribbons are elastic, the polymeric strands are elastic, or both the polymeric ribbons and polymeric strands are elastic. For example, the second polymeric composition may include thermoplastic elastomers such as ABA block copolymers, polyurethane elastomers, polyolefin elastomers (e.g., metallocene polyolefin elastomers), polyamide elastomers, ethylene vinyl acetate elastomers, polyvinyl ethers, acrylics, especially those having long chain alkyl groups, poly-alpha-olefins, asphaltics, silicones, polyester elastomers, and natural rubber. An ABA block copolymer elastomer generally is one where the A blocks are polystyrenic, and the B blocks are conjugated dienes (e.g., lower alkylene dienes). The A block is generally formed predominantly of substituted (e.g., alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastic polymers can be blended with block copolymer elastomers, and various elastic polymers may be blended to have varying degrees of elastic properties.

Many types of thermoplastic elastomers are commercially available, including those from BASF, Florham Park, N.J., under the trade designation "STYROFLEX" from Kraton Polymers, Houston, Tex., under the trade designation "KRATON" from Dow Chemical, Midland, Mich., under the trade designation "PELLETHANE," "ENGAGE," "INFUSE," VERSIFY," and "NORDEL" from DSM, Heerlen, Netherlands, under the trade designation "ARNITEL" from E. I. duPont de Nemours and Company, Wilmington, Del., under the trade designation "HYTREL," from ExxonMobil, Irving, Tex. under the trade designation "VISTAMAXX."

Mixtures of any of the above-mentioned polymers may be useful in the polymeric nettings disclosed herein. For example, a polyolefin may be blended with an elastomeric polymer to lower the modulus of the polymeric composition, which may be desirable for certain application. Such a blend may or may not be elastic.

In some embodiments, polymeric materials from which polymeric netting can be made comprise a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the art (e.g., to achieve desired color, tone, opacity, transmissivity, etc.).

In some embodiments, a single strand of the polymeric strands or a single ribbon of the polymeric ribbons in the netting may include different polymeric compositions. For example, at least one of the polymeric strands in the polymeric netting may have a core made of one polymeric composition and a sheath of a different polymeric composition. Such nets can be extruded as described in U.S. Pub. No. 2014/220328 (Ausen et al.), the disclosure of which is incorporated herein by reference. Nets in which their opposing major surfaces are made from different polymeric compositions are described in co-pending PCT Pub. No WO2014/164242, published Oct. 9, 2014.

In some embodiments of netting described herein and/or made by a method described herein, the distance between bonds can be in a range from 0.5 mm to 20 mm (in some embodiments, in a range from 0.5 mm to 10 mm). In some embodiments of netting described herein and/or made by a method described herein have a basis weight in a range from 5 $g/m^2$ to 750 $g/m^2$ (in some embodiments, 5 $g/m^2$ to 400 $g/m^2$ or 10 $g/m^2$ to 200 $g/m^2$). In some embodiments of netting described herein and/or made by a method described herein have a thickness up to 4 mm (in some embodiments, up to 3.5 mm, 3 mm, 2 mm, 1 mm, 0.75 mm, or less than 0.75 mm; in a range from 10 micrometers to 4 mm, 10 micrometers to 3.5 mm, 10 micrometers to 3 mm, 10 micrometers to 2 mm, 10 micrometers to 1 mm, 10 micrometers to 750 micrometers, 10 micrometers to less than 750 micrometers, 10 micrometers to 749 micrometers, 10 micrometers to 700 micrometers, or 10 micrometers to 650 micrometers).

Figure 13:
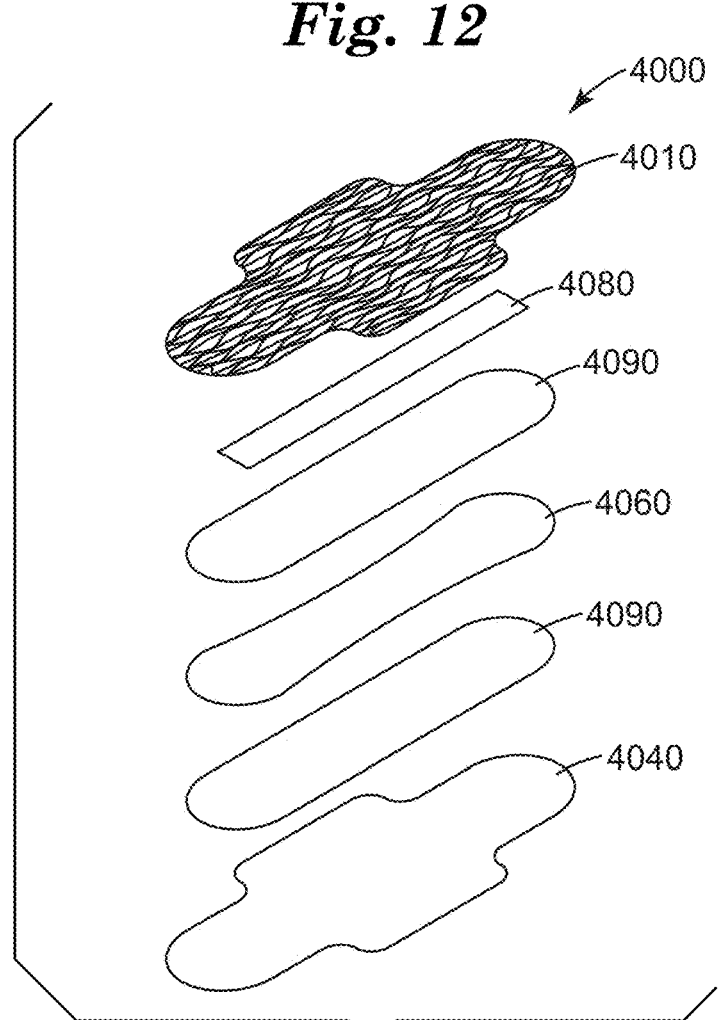
FIG. 13 is a schematic exploded view of an example of an absorbent article described herein.

Polymeric netting described herein and/or made as described herein is useful, for example, in absorbent articles. Accordingly, the present disclosure provides an absorbent article including a polymeric netting according to the present disclosure. Personal care absorbent articles, such as diapers, training pants, adult incontinence garments, and feminine hygiene pads (e.g., sanitary napkins and pantyliners) and wound care absorbent articles (e.g., wound dressings and bandages) are often constructed using a skin-facing fluid pervious topsheet, a garment-facing fluid impervious backsheet, and an absorbent core positioned there between. An exploded schematic view of an example of an embodiment of an absorbent article 4000 described herein is shown in FIG. 13. In absorbent articles described herein, the absorbent core 4060 is typically interposed between the polymeric netting and the backsheet 4040. The polymeric netting can be useful, for example as at least one of a topsheet 4010 or acquisition/distribution layer 4080. In the illustrated embodiment, the polymeric netting forms topsheet 4010. When used as an acquisition/distribution layer 4080, the polymeric netting may also be located between the absorbent core 4060 and the backsheet 4040 or within the absorbent core 4060 (e.g., between two tissue sheets 4090).

Polymeric netting described herein advantageously can be used as a topsheet in an absorbent article. Referring to FIG. 13, the topsheet 4010 is the layer against the user's skin and so the first layer in contact with liquid or other exudate from the user. The topsheet desirably serves several purposes including keeping the absorbent material contained within the article, allowing fluids to rapidly pass through to the absorbent core, providing a skin friendly, comfortable contact surface for the skin contacted by the article, keeping the skin clean and dry, and helping to prevent absorbed fluid from coming into contact with the skin. When used as a topsheet 4010 for hygiene articles, the polymeric netting may have a configuration wherein the polymeric ribbons face the wearer and the polymeric strands face the absorbent layer of the hygiene article.

The polymeric netting can have at least one of the following features: capable of rapid fluid uptake, directs the fluid in the machine direction of the material, offers a high degree of resistance to rewet, presents a dry to the touch skin facing surface after exposure to fluids, and due to the flexibility of the ribbon like element provides a cleansing action to the skin, driven by natural body motions, resulting in cleaner and drier skin for the wearer of an absorbent hygiene article utilizing this new topsheet material.

In an absorbent article according to the present disclosure, the backsheet (e.g., 4040 shown in FIG. 13), sometimes referred to as the outer cover, is the farthest layer from the user. The backsheet is typically formed of a thin thermoplastic film (e.g., polyethylene film) which is substantially impermeable to liquid. The backsheet functions to prevent body exudates absorbed by the absorbent core from wetting or soiling the wearer's clothing, bedding, or other materials contacting the absorbent article. A variety of materials for the backsheet may be suitable in an absorbent article according to the present disclosure. For example, the backsheet may comprise a polyethylene film (e.g., having an initial thickness of about 0.5 mil (0.012 millimeter) to about 5.0 mil (0.12 millimeter)), a woven or nonwoven fibrous web constructed or treated to impart the desired level of liquid impermeability, a laminate of a woven or nonwoven fabric and thermoplastic film, or a vapor or gas permeable microporous "breathable" material that is substantially impermeable to liquid. Films useful as backsheets, for example, may be embossed and/or matte finished to provide a more aesthetically pleasing appearance.

In an absorbent article described herein, the absorbent core (e.g., 4060 as shown in FIG. 13) typically includes a natural, synthetic, or modified natural organic polymer that can absorb and hold liquids (e.g., aqueous liquids). In some embodiments, the polymer is crosslinked. The term "crosslinked" refers to any means for effectively rendering normally water-soluble materials substantially water insoluble but swellable. Such absorbent materials are usually designed to quickly absorb liquids and hold them, usually without release. The size and the absorbent capacity of the absorbent core is typically compatible with the size of the intended wearer and the liquid loading imparted by the intended use of the absorbent article. Various absorbents may be useful, for example, a cellulosic material (e.g., wood pulp fluff), hydrophilic, synthetic meltblown fibers, superabsorbent polymer (SAP), an acrylic foam absorbent (e.g., foams described in U.S. Pat. No. 5,817,704 (Shiveley et al.) and the references cited therein, prepared, for example, by polymerization of high internal phase emulsions), and any combination thereof. Absorbent materials may be zoned and their compositions chosen to move liquids away from the original location of the incoming insult to more remote storage locations. In some embodiments, the absorbent core can include one or more substantially hydrophilic tissue sheets 4090 to help maintain the integrity, for example, of the structure of the absorbent core. The tissue sheet(s), which may be one tissue sheet wrapped around to provide two major facing surfaces of the absorbent core, can include absorbent cellulosic material (e.g., creped wadding or a high wet-strength tissue). In some embodiments, the tissue sheet can be configured to rapidly distribute liquid over the absorbent core. In these embodiments, the tissue sheet may be considered a distribution layer, which moves fluid from the point of initial deposition to the location where storage is desired.

Some absorbent articles include an acquisition layer 4080, which can be useful for quickly accepting an incoming insult and either absorb, hold, channel, or otherwise manage the liquid so that it does not leak outside the article. The acquisition layer may also be referred to, for example, as a surge layer, intake layer, transfer layer, or transport layer. An acquisition layer is generally capable of handling an incoming insult of between about 60 and 100 milliliters (mL) at an insult volumetric flow rate of from about 5 to 20 mL/second, for infants, for example. An acquisition layer is generally subjacent the topsheet at the surface opposite the user's skin. Various woven and nonwoven webs and foams can be used to construct an acquisition layer. Acquisition layers may be composed of a substantially hydrophobic material, and the hydrophobic material may optionally be treated with a surfactant or otherwise processed to impart a desired level of wettability and hydrophilicity. In some embodiments, acquisition layer 4080 can have a generally uniform thickness and cross-sectional area. The polymeric netting according to the present disclosure may be useful as an acquisition layer in combination with a conventional topsheet (e.g., a nonwoven or an apertured film as described below) as a topsheet in combination with a conventional acquisition layer, or in some embodiments as a replacement for both a conventional topsheet and acquisition layer. In other words, when the polymeric netting according to the present disclosure is used as a topsheet, the need for the acquisition layer may be eliminated.

Suitable conventional attachment techniques may be useful for assembling an absorbent article according to the present disclosure. When used as a topsheet 4010, the polymeric netting according to the present disclosure may be attached to the absorbent core 4060 or the acquisition layer 4080 (if used) using at least one of adhesive bonding (e.g., using water-based, solvent-based, or thermally activated adhesives), thermal bonding, ultrasonic bonding, needling, or pin aperturing. When used as an acquisition layer 4080, the polymeric netting according to the present disclosure can be attached to both the conventional topsheet and the absorbent core 4060 also using any one of these methods. If adhesive bonding is used, the amount of adhesive add-on should be sufficient to provide the desired level(s) of bonding, without excessively restricting the flow of liquid into the absorbent core 4060.

When used as a topsheet in an absorbent article, the polymeric netting can overcome disadvantages of conventional topsheet materials. For diapers, incontinence articles, and feminine hygiene pads the conventional types of topsheet, generally fall into two main groups: nonwovens and apertured films. Nonwovens have the advantage of being soft and cloth-like in feel. Nonwovens can be made hydrophilic (e.g., by treating with surfactant) to allow rapid fluid transport through the nonwoven to the absorbent. Such hydrophilic materials tend to cause user to feel wetness possibly due to small amounts of fluid being retained in the nonwoven. Retained fluid in the nonwoven also makes the fluid more visible, which is undesirable. Some hydrophilic nonwovens also have a tendency to direct fluids toward the lateral edges of the pad, potentially contributing to side leakage. To achieve the goals of softness and dry feel in nonwoven topsheets, sometimes the nonwoven is made of hydrophobic fibers. The use of hydrophobic fibers typically results in improved dry feel, but hydrophobic nonwovens may not allow rapid fluid transport into the pad. Sometimes hydrophobic nonwovens can cause fluid to pool on the surface of the pad, which can also result in leakage. An advantage of using apertured films as topsheets for absorbent articles is that they provide a relatively clean and dry surface as exudates passes through the film layer and into the interior of the pad. A drawback of such film-based topsheets is that they do not provide the degree of softness and comfort that a nonwoven topsheet provides.

In use as an absorbent article, the structure of the polymeric netting according to the present disclosure, with its polymeric ribbons separated from each other by polymeric strands that are significantly shorter, creates a plurality of air flow channels along the lengths of the polymeric ribbons and that allow air to circulate between the absorbent and the skin of the wearer even while the first edges of the polymeric ribbons, distal from the absorbent, are in contact with the skin of the wearer. These channels, which are absent from conventional topsheet materials, can provide a feeling of dryness and comfort. The first edges of the polymeric ribbons, which extend above the height of the polymeric strands, are free to flex and bend in response to any lateral forces exerted on them (e.g., through movement of the user). The flexibility of the polymeric ribbons adds to a feeling of softness against the user's skin. It is also believed that the ability of the polymeric ribbons to bend allows them to provide a cleansing action when the absorbent article is shifted slightly in its position relative to the user's skin. When the polymeric ribbons contact the user's skin, small movements of the user (e.g., walking) can cause the polymeric ribbons to bend which may allow the polymeric ribbons to come into contact with a drop of liquid on a user's skin and draw it down to contact the absorbent. In this way, the polymeric ribbons serve as miniature squeegees for removing liquid from the skin.

With the polymeric nettings according to the present disclosure and/or made according to a method disclosed herein, it may be useful to have the polymeric ribbons spread apart from one another to a greater extent in one portion of the absorbent article than in the other. Attaching the spread polymeric netting to the absorbent or another layer of the article is useful for holding the web in this spread open condition. Spreading in certain locations allows the performance of the polymeric netting to be tailored to provide, for example, a different uptake rate and other performance characteristics near the lateral centerline of the article than near the lateral edges of the article. However, in some embodiments it may be desired to spread the web in the cross direction uniformly across the entire width of the polymeric netting.

The polymeric compositions selected for the polymeric ribbons and polymeric strands when the polymeric netting is used in an absorbent article may be hydrophobic or hydrophilic as desired. Additional material modifiers (e.g., surfactants) can be added to at least one of the polymeric ribbons or polymeric strands to change their hydrophilicity or tailor how a liquid interacts with the polymeric netting. For example, the polymeric ribbons may be made relatively hydrophilic for quicker fluid penetration through the polymeric netting while the polymeric strands may be made hydrophobic to minimize rewet.

Exemplary embodiments of polymeric netting described herein and/or made by a method described herein may also be useful, for example, as part of a cleaning device, such as a wipe or a sponge. The cleansing action provided by the polymeric ribbons described above in connection with absorbent articles may also make polymeric netting described herein and/or made by a method described herein useful for cleaning hard surfaces. Many times cleaning sheets are too flat over the surface being cleaned and therefore only the leading edge of the cleaning sheet will load with material. A variety of techniques have been disclosed to raise portions of the cleaning sheet or to have recessed portions of the cleaning sheet to more effectively get dirt, dust and debris to capture and retain across the working surface; see, e.g., U.S. Pat. No. 7,757,334 (Patel et al.) and U.S. Pat. Appl. Pub. Nos. 2007-0136967 (Tochacek et al.) and 2009-0144923 (Tuman et al.). It is believed that the first edges of the polymeric ribbons can be useful at the working surface of a cleaning wipe or sponge to scoop up debris during use, and the channels in the polymeric netting structure can help deliver the debris to a retaining surface within the wipe or sponge.

Figure 14:
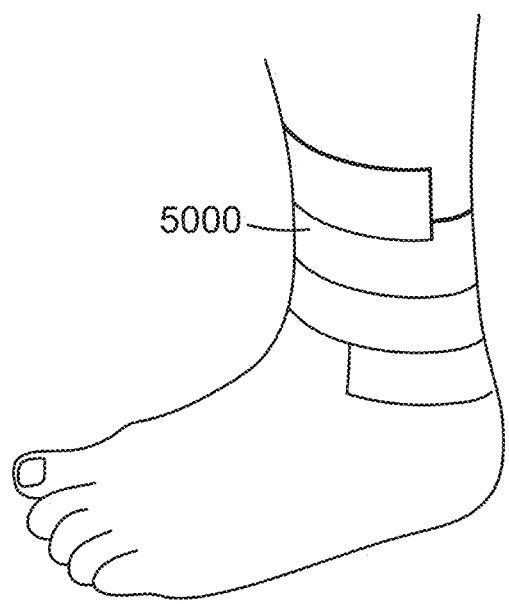
FIG. 14 is a perspective view of a foot showing an embodiment of a polymeric netting described herein used as a wrap.

Embodiments of polymeric netting described herein and/or made by a method described herein are also useful, for example, as elastic wraps. Such wraps can be useful, for example, in medical and athletic applications. For example, a polymeric netting according to the present disclosure can be useful in compression therapy, in which the application of external pressure to vascular elements increases interstitial pressure. The resulting improvement in venous return and alleviation of various symptoms (e.g., venous ulcerations and edema) makes compression therapy a useful treatment in venous and lymphatic disease, for example, polymeric netting described herein and/or made by a method described herein in use as a wrap 5000 is illustrated in FIG. 14. The net structure of wrap 5000 allows for two-way stretching and high breathability. The wrap may be secured using any conventional fastener (e.g., adhesive or mechanical fasteners).

In use as a wrap, when the polymeric ribbons in the polymeric netting described herein and/or made by a method described herein in any of their embodiments are positioned in contact with the wearer's skin, the polymeric ribbons that extend above the height of the polymeric strands are free to flex and bend in response to any lateral forces exerted on the tops of these ribbons. In other words, the ends of the polymeric ribbons are free to bend over the polymeric strands. Because of this movement, it is believed that micromuscular movements during wear are more comfortable than with the elastic wraps that do not have this deflection behavior. The deflection of the polymeric ribbons makes the compression wrap feel soft and spongy to the touch.

Embodiments of polymeric netting described herein and/or made by a method described herein in which the polymeric ribbons and polymeric strands are different colors, polymeric nettings useful as wraps, for example, can have unique aesthetic appeal. Using different colors in the polymeric ribbons from the polymeric strands can result in an iridescence in which the color of the wrap appears to be different depending upon the angle of viewing. Thus, in some embodiments, polymeric nettings according to the present disclosure useful as wraps have polymeric ribbons that are a different color from the polymeric strands.

In some applications, embodiments of polymeric netting described herein and/or made by a method described herein can be used, for example, to provide spacers between filtering layers for filtration packs and/or to provide rigidity and support for filtration media. In some embodiments, several layers of the polymeric netting are used, where each layer is positioned to provide optimal filtering. Also, in some embodiments, the elastic feature of some polymeric netting described herein and/or made by a method described herein can accommodate expansion of the filter as the filter fills up.

In addition to the applications described above, polymeric netting described herein and/or made by a method described herein may be useful in a variety of other applications, including as a surface layer for surgical drapes and gowns, cast padding, tapes (including for medical applications), pest control articles (e.g., mosquito nettings), geotextile applications (e.g., erosion control textiles), water/vapor management in clothing, reinforcement for nonwoven articles (e.g., paper towels), self-bulking articles (e.g., for packaging) where the polymeric netting thickness is increased by stretching polymeric nettings with polymeric ribbons and polymeric strands having very different moduli or elasticities, floor coverings (e.g., rugs and temporary mats), grip supports (e.g., for tools and athletic articles), and pattern-coated adhesives.

In some embodiments, polymeric netting described herein and/or made by a method described herein is joined to a carrier for ease of handling or for making a laminate for a selected application. The polymeric netting may be joined to a carrier, for example, by lamination (e.g., extrusion lamination), adhesives (e.g., pressure sensitive adhesives), or other bonding methods (e.g., ultrasonic bonding, compression bonding, or surface bonding).

The carrier may be continuous (i.e., without any through-penetrating holes) or discontinuous (e.g., comprising through-penetrating perforations or pores). The carrier may comprise a variety of suitable materials including woven webs, non-woven webs (e.g., spunbond webs, spunlaced webs, airlaid webs, meltblown web, and bonded carded webs), textiles, plastic films (e.g., single- or multilayered films, coextruded films, laterally laminated films, or films comprising foam layers), and combinations thereof. In some embodiments, the carrier is a fibrous material (e.g., a woven, nonwoven, or knit material). Examples of materials for forming thermoplastic films or thermoplastic fibers for a fibrous carrier include polyolefins (e.g., polyethylene, polypropylene, polybutylene, ethylene copolymers, propylene copolymers, butylene copolymers, and copolymers and blends of these polymers), polyesters, and polyamides. The fibers may also be multi-component fibers, for example, having a core of one thermoplastic material and a sheath of another thermoplastic material. In some embodiments, the carrier comprises multiple layers of nonwoven materials with, for example, at least one layer of a meltblown nonwoven and at least one layer of a spunbonded nonwoven, or any other suitable combination of nonwoven materials. For example, the carrier may be a spunbond-meltbond-spunbond, spunbond-spunbond, or spunbond-spunbond-spunbond multilayer material. Or, the carrier may be a composite web comprising a nonwoven layer and a dense film layer. Useful carriers may have any suitable basis weight or thickness that is desired for a particular application. For a fibrous carrier, the basis weight may range, for example, from at least about 5, 8, 10, 20, 30, or 40 grams/m$^2$, up to about 400, 200, or 100 grams/m$^2$. The carrier may be up to about 5 mm, about 2 mm, or about 1 mm in thickness and/or at least about 0.1, about 0.2, or about 0.5 mm in thickness.

In some embodiments where the polymeric netting is made from a thermoplastic, the thermoplastic can be joined to a fibrous web carrier using surface bonding or loft-retaining bonding techniques. The term "surface-bonded" when referring to the bonding of fibrous materials means that parts of fiber surfaces of at least portions of fibers are melt-bonded to at least a portion of the polymeric netting, in such a manner as to substantially preserve the original (pre-bonded) shape of the polymeric netting, and to substantially preserve at least some portions of the polymeric netting in an exposed condition, in the surface-bonded area. Quantitatively, surface-bonded fibers may be distinguished from embedded fibers in that at least about 65% of the surface area of the surface-bonded fiber is visible above the polymeric netting in the bonded portion of the fiber. Inspection from more than one angle may be necessary to visualize the entirety of the surface area of the fiber. The term "loft-retaining bond" when referring to the bonding of fibrous materials means a bonded fibrous material comprises a loft that is at least 80% of the loft exhibited by the material prior to, or in the absence of, the bonding process. The loft of a fibrous material as used herein is the ratio of the total volume occupied by the web (including fibers as well as interstitial spaces of the material that are not occupied by fibers) to the volume occupied by the material of the fibers alone. If only a portion of a fibrous web has the polymeric netting bonded thereto, the retained loft can be easily ascertained by comparing the loft of the fibrous web in the bonded area to that of the web in an unbonded area. It may be convenient in some circumstances to compare the loft of the bonded web to that of a sample of the same web before being bonded, for example, if the entirety of fibrous web has the polymeric netting bonded thereto. In some of these embodiments, the joining comprises impinging heated gaseous fluid (e.g., ambient air, dehumidified air, nitrogen, an inert gas, or other gas mixture) onto a first surface of the fibrous web carrier while it is moving; impinging heated fluid onto a major surface of the polymeric netting while the continuous web is moving; and contacting the first surface of the fibrous web with the polymeric netting so that the first surface of the fibrous web is melt-bonded (e.g., surface-bonded or bonded with a loft-retaining bond) to the polymeric netting. Impinging heated gaseous fluid onto the first surface of the fibrous web and impinging heated gaseous fluid on a major surface of the polymeric netting may be carried out sequentially or simultaneously. Further methods and apparatus for joining a continuous web to a fibrous carrier web using heated gaseous fluid may be found in U.S. Pat. Appl. Pub. Nos. 2011/0151171 (Biegler et al.) and 2011/0147475 (Biegler et al.).

In some embodiments wherein the polymeric netting is joined to a carrier, one or more zones of the carrier may comprise one or more elastically extensible materials extending in at least one direction when a force is applied and returning to approximately their original dimension after the force is removed. In some embodiments, at least the portion of the carrier joined to the multiple strands of the backing or loop material is not stretchable. In some embodiments, the portion of carrier joined to the multiple strands will have up to a 10 (in some embodiments, up to 9, 8, 7, 6, or 5) percent elongation in the cross-direction. In some embodiments, such constructions may be subjected to mechanical activation (e.g., ring rolling) to render them elastomeric. In some embodiments, the carrier may be extensible but nonelastic. In other words, the carrier may have an elongation of at least 5, 10, 15, 20, 25, 30, 40, or 50 percent but substantially no recovery from the elongation (e.g., up to 10 or 5 percent recovery). Suitable extensible carriers may include nonwovens (e.g., spunbond, spunbond meltblown spunbond, or carded nonwovens). In some embodiments, the nonwoven may be a high elongation carded nonwoven (e.g., HEC). In some embodiments, the carrier is not pleated.

Exemplary Embodiments

1A. A polymeric netting comprising polymeric ribbons and polymeric strands, each of the polymeric ribbons and polymeric strands having a length, a width, and a thickness, wherein the length is the longest dimension and the width is the shortest dimension, wherein a plurality of the polymeric strands are bonded together to form a netting layer, wherein adjacent polymeric strands in the netting layer are bonded intermittently at multiple locations along their respective lengths, wherein the netting layer has first and second opposing major surfaces, wherein the polymeric ribbons have a thickness-to-width aspect ratio of at least 2:1 and a minor surface defined by their width and length, and wherein the minor surface of a plurality of the polymeric ribbons is bonded to the first major surface of the netting layer.

2A. The polymeric netting of Exemplary Embodiment 1A, wherein each polymeric ribbons is bonded to only one of the polymeric strands.

3A. The polymeric netting of any preceding A Exemplary Embodiment, wherein each polymeric ribbons is intermittently bonded to a strand.

4A. The polymeric netting of either Exemplary Embodiment 1A or 2A, wherein each polymeric ribbon is continuously bonded along the length of a strand.

5A. The polymeric netting of any preceding A Exemplary Embodiment, wherein height-to-width aspect ratio is at least 3:1.

6A. The polymeric netting of any preceding A Exemplary Embodiment, wherein at least some of the polymeric ribbons have a width that is smaller than a width of at least some of the polymeric strands.

7A. The polymeric netting of any preceding A Exemplary Embodiment, wherein at least some of the polymeric ribbons have a height that is greater than a height of at least some of the polymeric strands.

8A. The polymeric netting of any preceding A Exemplary Embodiment, wherein the polymeric ribbons comprise a different polymeric composition than at least some of the polymeric strands.

9A. The polymeric netting of any preceding A Exemplary Embodiment, wherein at least some of the polymeric ribbons have a different color than at least some of the polymeric strands.

10A. The polymeric netting of any preceding A Exemplary Embodiment, wherein at least the polymeric ribbons are elastic or the polymeric strands are elastic.

11A. The polymeric netting of any preceding A Exemplary Embodiment, wherein the minor surface of a second plurality of the polymeric ribbons is bonded to the second major surface of the netting layer.

12A. An absorbent article comprising the polymeric netting of any preceding A Exemplary Embodiment, a liquid impermeable backsheet, and an absorbent core, wherein the absorbent core is between the polymeric netting and the backsheet, the polymeric netting is between the absorbent core and the backsheet, or the polymeric netting is within the absorbent core.

1B. A method of making a polymeric netting of any preceding A Exemplary Embodiment, the method comprising:

providing an extrusion die comprising at least one cavity, a dispensing surface, and fluid passageways between the at least one cavity and the dispensing surface, wherein the dispensing surface has an array of first dispensing orifices separated by an array of second dispensing orifices and an array of third dispensing orifices disposed above or below the array of the first dispensing orifices and the array of the second dispensing orifices, wherein the first, second, and third dispensing orifices each have a height and a width, wherein the third dispensing orifices each have a height-to-width aspect ratio of at least 5:1, and wherein at least one third dispensing orifice is disposed either completely above or below the first dispensing orifices;

dispensing first polymeric strands from the first dispensing orifices at a first speed while simultaneously dispensing second polymeric strands from the second dispensing orifices at a second speed to provide a netting layer having first and second major surfaces, wherein the second speed is at least twice the first speed; and simultaneously dispensing polymeric ribbons from the third dispensing orifices onto the first major surface of the netting layer.

2B. The method of Exemplary Embodiment 1B, wherein a majority of the third dispensing orifices are disposed either completely above or below the first dispensing orifices.

3B. The method of Exemplary Embodiment 1B, wherein a majority of the third dispensing orifices are disposed completely above the first dispensing orifices.

4B. The method of Exemplary Embodiment 1B, wherein a majority of the third dispensing orifices are disposed completely below the first dispensing orifices.

5B. The method of Exemplary Embodiment 1B, wherein all of the third dispensing orifices are disposed either completely above or below the first dispensing orifices.

6B. The method of Exemplary Embodiment 1B, wherein all of the third dispensing orifices are disposed completely above the first dispensing orifices.

7B. The method of Exemplary Embodiment 1B, wherein all of the third dispensing orifices are disposed completely below the first dispensing orifices.

8B. The method of any preceding B Exemplary Embodiment, wherein the first dispensing orifices and second dispensing orifices are arranged in a single row across the dispensing surface.

9B. The method of any preceding B Exemplary Embodiment, wherein the extrusion die comprises at least a first and second cavity, first fluid passageways between the first cavity and the first dispensing orifices, and second fluid passageways between the second cavity and the second dispensing orifices.

10B. The method of any preceding B Exemplary Embodiment, wherein the extrusion die comprises at least a first cavity, a second cavity, and a third cavity, first fluid passageways between the first cavity and the first dispensing orifices, second fluid passageways between the second cavity and the second dispensing orifices, and third fluid passageways between the third cavity and the third dispensing orifices.

1C. An extrusion die comprising at least one cavity, a dispensing surface, and fluid passageways between the at least one cavity and the dispensing surface, wherein the dispensing surface has an array of first dispensing orifices separated by an array of second dispensing orifices and an array of third dispensing orifices disposed above or below the array of the first dispensing orifices and the array of the second dispensing orifices, wherein the first, second, and third dispensing orifices each have a height and a width, wherein the third dispensing orifices each have a height-to-width aspect ratio of at least 5:1, and wherein at least one third dispensing orifice is disposed either completely above or below the first dispensing orifices.

2C. The extrusion die of Exemplary Embodiment 1C, wherein a majority of the third dispensing orifices are disposed either completely above or below the first dispensing orifices.

3C. The extrusion die of Exemplary Embodiment 1C, wherein a majority of the third dispensing orifices are disposed completely above the first dispensing orifices.

4C. The extrusion die of Exemplary Embodiment 1C, wherein a majority of the third dispensing orifices are disposed completely below the first dispensing orifices.

5C. The extrusion die of Exemplary Embodiment 1C, wherein all of the third dispensing orifices are disposed either completely above or below the first dispensing orifices.

6C. The extrusion die of Exemplary Embodiment 1C, wherein all of the third dispensing orifices are disposed completely above the first dispensing orifices.

7C. The extrusion die of Exemplary Embodiment 1C, wherein all of the third dispensing orifices are disposed completely below the first dispensing orifices.

8C. The extrusion die of any preceding C Exemplary Embodiment, wherein the first dispensing orifices and second dispensing orifices are arranged in a single row across the dispensing surface.

9C. The extrusion die of any preceding C Exemplary Embodiment, wherein the extrusion die comprises at least a first and second cavity, first fluid passageways between the first cavity and the first dispensing orifices, and second fluid passageways between the second cavity and the second dispensing orifices.

10C. The extrusion die of any preceding C Exemplary Embodiment, wherein the extrusion die comprises at least a first cavity, a second cavity, and a third cavity, first fluid passageways between the first cavity and the first dispensing orifices, second fluid passageways between the second cavity and the second dispensing orifices, and third fluid passageways between the third cavity and the third dispensing orifices.

Foreseeable modifications. In order that this disclosure can be more fully understood, the following examples are set forth. It should be understood that these examples are for illustrative purposes only, and are not to be construed as limiting this disclosure in any manner. All parts and percentages are by weight unless otherwise indicated.

EXAMPLES

Example 1

A co-extrusion die as generally depicted in FIG. 8 and assembled with a multi shim repeating pattern of extrusion orifices as generally illustrated in FIG. 7, was prepared. The thickness of the shims in the repeat sequence was 4 mils (0.102 mm). These shims were formed from stainless steel, with perforations cut by a wire electron discharge machining. The height of dispensing orifice 357 of shim 300 was cut to 100 mils (2.54 mm), and the height of the dispensing orifice 356 of shim 300 was cut to 30 mils (0.762 mm). The height of the dispensing orifice of shims 100 and 400 were cut to 30 mils (0.762 mm) The shims were stacked in a repeating sequence 100, 300, 300, 100, 200, 200, 200, 200, 400 400, 400, 400, 400, 400, 400, 400, 200, 200, 200, 200. The extrusion orifices were aligned in a collinear, alternating arrangement. The total width of the shim setup was about 13 cm (5 inches).

The inlet fittings on the two end blocks were each connected to three conventional single-screw extruders. The extruders feeding the first, second, and third cavities were loaded with propylene based elastomer (obtained under the trade designation "VISTAMAXX 3980" from Exxon Mobil, Irving, Tex.). The extruder feeding the third cavity was a blend of propylene based elastomer ("VISTAMAXX 3980") dry blended with 2% color concentrate (obtained under the trade designation "3M Blue" from PolyOne Distribution, Eagan, Minn.).

Figure 10:
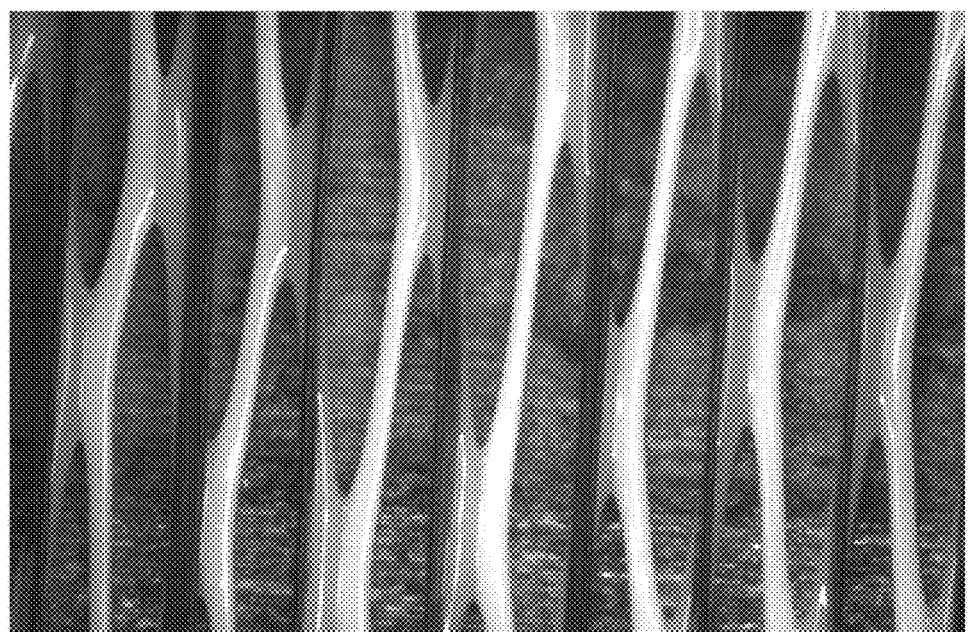
FIG. 10 is a photograph of a plan view of the polymeric netting of Example 1.

The melt was extruded vertically into a quench roll takeaway. The quench roll was a smooth, temperature controlled, chrome plated steel roll, 20 cm in diameter. The quench temperature was controlled with internal water flow. The web path of the extruded louvered web wrapped 180 degrees around the chrome steel roll and then to a windup roll. Under these conditions a polymeric layer generally as depicted in FIG. 10 was formed.

Other process conditions are listed below:

| | | |
|---|---|---|
| Orifice width for the first orifice: | 0.406 mm | (oscillating clear) |
| Orifice height for the first orifice: | 0.762 mm | (oscillating clear) |
| Orifice width of the second orifice: | 0.812 mm | (straight clear) |
| Orifice height of the second orifice: | 0.762 mm | (straight clear) |
| Orifice width of the third orifice: | 0.203 mm | (louver blue) |
| Orifice height of the third orifice: | 2.54 mm | (louver blue) |
| Land spacing between orifices | 0.406 mm | |
| Flow rate of first polymer (oscillating) | 1.1 kg/hr | |
| Flow rate of second polymer (straight) | 0.72 kg/hr | |
| Flow rate of third polymer (louver) | 0.6 kg/hr | |

-continued

| | |
|---|---|
| Extrusion temperature | 232° C. |
| Quench roll temperature | 10° C. |
| Quench takeaway speed | 1.7 m/min |
| Melt drop distance | 3 cm |

Using an optical microscope, at 30× magnification, the dimensions of the resulting polymeric net are listed below.

| | |
|---|---|
| Net basis weight | 200 g/m² |
| Overall net Caliber | 1250 micrometers |
| Oscillating Strand width | 390 micrometers |
| Oscillating Strand height | 290 micrometers |
| Straight Strand width | 340 micrometers |
| Straight Strand height | 510 micrometers |
| Louvre width | 220 micrometers |
| Louvre height | 775 micrometers |
| Bond Length of net | 2.1 mm |
| Pitch machine direction | 8.6 mm |

Example 2

Figure 11:
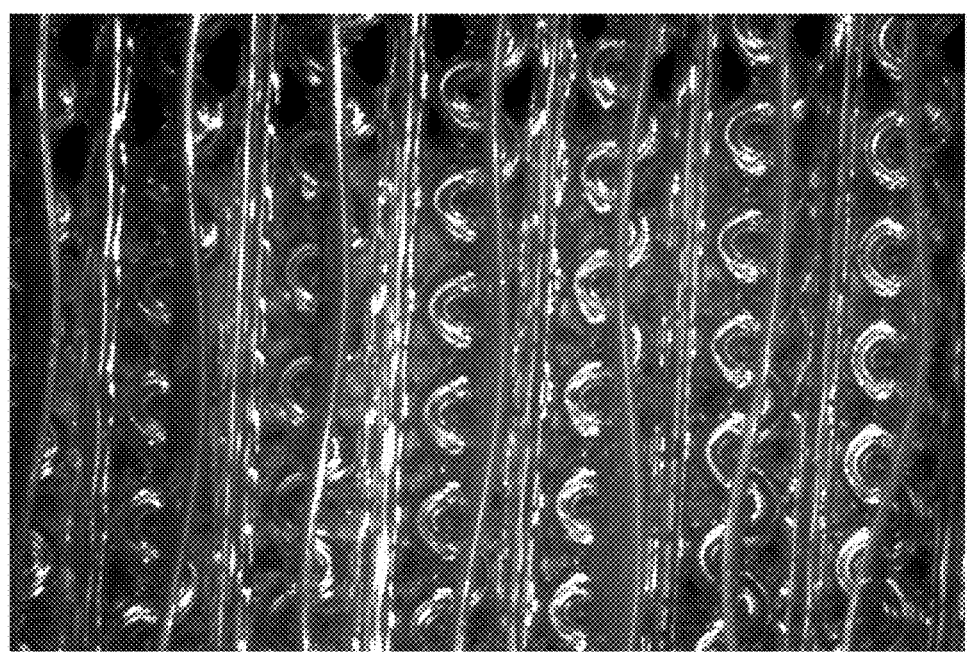
FIG. 11 is a photograph of a plan view of the polymeric netting of Example 2.

This Example was made the same as Example 1 with the following exceptions. The inlet fittings on the two end blocks were each connected to three conventional single-screw extruders. The extruders feeding the first and second cavities were loaded with styrene block copolymer based elastomer (obtained under the trade designation "KRATON 1643" from Kraton Performance Polymers, Houston, Tex.) dry blended with 2 wt. % color concentrate ("3M BLUE"). The extruder feeding the third cavity was a blend of 40% by weight of propylene based elastomer ("VISTAMAXX 3980") dry blended with 60 wt. % styrene block copolymer based elastomer ("KRATON 1643"), which was then dry blended with 2 wt. % color concentrate (obtained under the trade designation "3M RED" from Clariant, Minneapolis, Minn.). Under these conditions a polymeric layer generally as depicted in FIG. 11 was formed.

Other process conditions are listed below:

| | |
|---|---|
| Flow rate of first polymer (oscillating) | 1.5 kg/hr. |
| Flow rate of second polymer (straight) | 0.9 kg/hr. |
| Flow rate of third polymer (louver) | 0.6 kg/hr. |
| Extrusion temperature | 232° C. |
| Quench roll temperature | 10° C. |
| Quench takeaway speed | 0.55 m/min |
| Melt drop distance | 3 cm |

Using an optical microscope, at 30× magnification, the dimensions of the resulting polymeric net are listed below.

| | |
|---|---|
| Net basis weight | 745 g/m² |
| Overall net Caliber | 1850 micrometers |
| Oscillating Strand width | 500 micrometers |
| Oscillating Strand height | 540 micrometers |
| Straight Strand width | 560 micrometers |
| Straight Strand height | 850 micrometers |
| Louvre width | 200 micrometers |
| Louvre height | 1175 micrometers |
| Bond Length of net | 0.675 mm |
| Pitch machine direction | 1.3 mm |

Example 3

Figure 12:
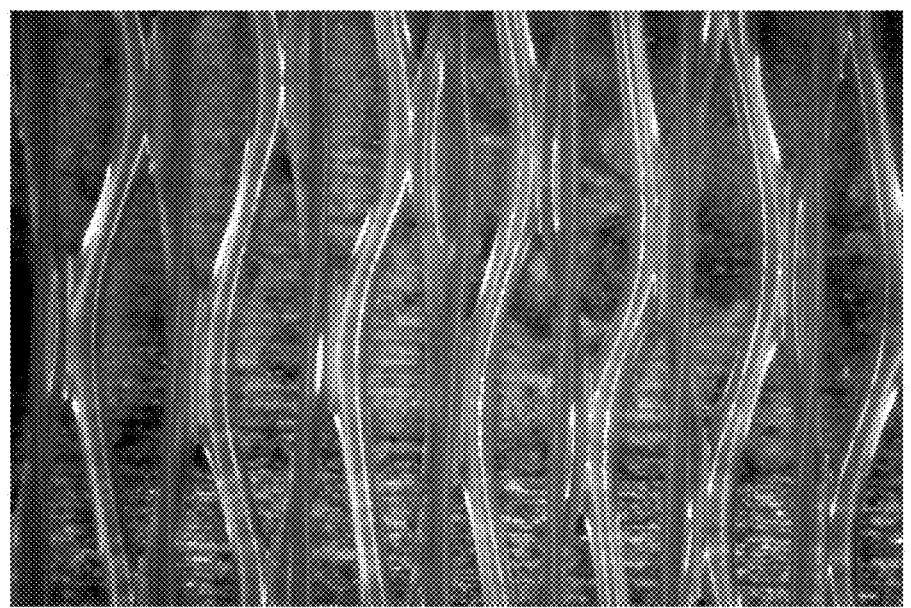
FIG. 12 is a photograph of a plan view of the polymeric netting of Example 3.

This Example was made the same as Example 1 with the following exceptions. The shims were stacked in a repeating sequence 100, 300, 300, 100, 200, 200, 200, 400, 400, 400, 400, 400, 400, 400, 400, 200, 200, 200. The inlet fittings on the two end blocks were each connected to three conventional single-screw extruders. The extruders feeding the first and second cavities were loaded with propylene based elastomer ("VISTAMAXX 3980"). The extruder feeding the third cavity was a blend of propylene based elastomer ("VISTAMAXX 3980") dry blended with 2% color concentrate (obtained under the trade designation "3M BLUE" from PolyOne Distribution). Under these conditions a polymeric layer generally as depicted in FIG. 12 was formed.

Other process conditions are listed below:

| | |
|---|---|
| Land spacing between orifices | 0.304 mm |
| Flow rate of first polymer (oscillating) | 1.1 kg/hr. |
| Flow rate of second polymer (straight) | 0.72 kg/hr. |
| Flow rate of third polymer (louver) | 0.6 kg/hr. |
| Extrusion temperature | 232° C. |
| Quench roll temperature | 10° C. |
| Quench takeaway speed | 1.7 m/min. |
| Melt drop distance | 3 cm |

Using an optical microscope, at 30× magnification, the dimensions of the resulting polymeric net are listed below.

| | |
|---|---|
| Net basis weight | 290 g/m² |
| Overall net Caliber | 1160 micrometers |
| Oscillating Strand width | 475 micrometers |
| Oscillating Strand height | 400 micrometers |
| Straight Strand width | 380 micrometers |
| Straight Strand height | 540 micrometers |
| Louvre width | 210 micrometers |
| Louvre height | 660 micrometers |
| Bond Length of net | 2.2 mm |
| Pitch machine direction | 7.1 mm |

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A polymeric netting comprising polymeric ribbons and polymeric strands, each of the polymeric ribbons and polymeric strands having a length, a width, and a thickness, wherein the length is the longest dimension and the width is the shortest dimension, wherein a plurality of the polymeric strands are bonded together to form a netting layer, wherein adjacent polymeric strands in the netting layer are bonded intermittently at multiple locations along their respective lengths to form strand bond regions along the thickness of the strands, wherein the netting layer has first and second opposing major surfaces defined by their width and length, wherein the polymeric ribbons have a thickness-to-width aspect ratio of at least 2:1 and a minor surface defined by their width and length, wherein the minor surface of a plurality of the polymeric ribbons is bonded to the first major surface of the netting layer to form ribbon bond regions that are substantially normal to the strand bond regions, and wherein with regard to the polymeric strands and polymeric ribbons, each polymeric ribbon is bonded to only one polymeric strand and each polymeric strand is bonded to only one polymeric ribbon.

2. The polymeric netting of claim 1, wherein each polymeric ribbon is intermittently bonded to a strand.

3. The polymeric netting of claim 1, wherein each polymeric ribbon is continuously bonded along the length of a strand.

4. The polymeric netting of claim 1, wherein the height-to-width aspect ratio of the polymeric ribbons is at least 3:1.

5. The polymeric netting of claim 1, wherein at least some of the polymeric ribbons have a width that is smaller than a width of at least some of the polymeric strands.

6. The polymeric netting of claim 1, wherein at least some of the polymeric ribbons have a height that is greater than a height of at least some of the polymeric strands.

7. The polymeric netting of claim 1, wherein the polymeric ribbons comprise a different polymeric composition than at least some of the polymeric strands.

8. The polymeric netting of claim 1, wherein at least some of the polymeric ribbons have a different color than at least some of the polymeric strands.

9. The polymeric netting of claim 1, wherein at least the polymeric ribbons are elastic or the polymeric strands are elastic.

10. The polymeric netting of claim 1, wherein the minor surface of a second plurality of the polymeric ribbons is bonded to the second major surface of the netting layer.

11. An absorbent article comprising the polymeric netting of claim 1, a liquid impermeable backsheet, and an absorbent core, wherein the absorbent core is between the polymeric netting and the backsheet, the polymeric netting is between the absorbent core and the backsheet, or the polymeric netting is within the absorbent core.

* * * * *